United States Patent
Ngo et al.

(10) Patent No.: US 12,182,052 B2
(45) Date of Patent: Dec. 31, 2024

(54) SLAVE-INITIATED COMMUNICATIONS OVER A SINGLE-WIRE BUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/154,127

(22) Filed: Jan. 13, 2023

(65) Prior Publication Data

US 2023/0229616 A1 Jul. 20, 2023

Related U.S. Application Data

(60) Provisional application No. 63/301,213, filed on Jan. 20, 2022.

(51) Int. Cl.
*G06F 13/40* (2006.01)
*G06F 13/42* (2006.01)

(52) U.S. Cl.
CPC ...... *G06F 13/4072* (2013.01); *G06F 13/4282* (2013.01)

(58) Field of Classification Search
CPC .................... G06F 13/4282; G06F 13/4072
See application file for complete search history.

(56) References Cited

U.S. PATENT DOCUMENTS 3,555,196 A 1/1971 Singer
3,953,835 A 4/1976 Cuccio et al.
(Continued)

FOREIGN PATENT DOCUMENTS

CN 101501607 A 8/2009
CN 102591834 A 7/2012
(Continued)

OTHER PUBLICATIONS

Extended European Search Report for European Patent Application No. 22208632.4, mailed May 2, 2023, 11 pages.
(Continued)

*Primary Examiner* — Henry Tsai
*Assistant Examiner* — Harry Z Wang
(74) *Attorney, Agent, or Firm* — Withrow & Terranova, P.L.L.C.

(57) ABSTRACT

Slave-initiated communications over a single-wire bus are described in the present disclosure. In contrast to a conventional single-wire bus apparatus wherein communications over the single-wire bus are always initiated by a master circuit, a single-wire bus apparatus disclosed herein allows a slave circuit(s) to initiate communications over the single-wire bus. More specifically, multiple slave circuits can concurrently contend for access to the single-wire bus via current mode signaling (CMS). In response to the CMS asserted by the multiple slave circuits, a master circuit provides a number of pulse-width modulation (PWM) symbols over the single-wire bus to indicate which of the multiple slave circuits is granted access to the single-wire bus. By supporting slave-initiated communications over the single-wire bus, it is possible to improve efficiency, cost, and power consumption in an electronic device (e.g., smartphone) wherein the single-wire bus apparatus is deployed.

21 Claims, 12 Drawing Sheets

(56) References Cited

U.S. PATENT DOCUMENTS

| | | |
|---|---|---|
| 4,336,447 A | 6/1982 | Oguchi et al. |
| 4,424,812 A | 1/1984 | Lesnick |
| 4,497,068 A | 1/1985 | Fischer |
| 4,736,367 A | 4/1988 | Wroblewski et al. |
| 5,412,644 A | 5/1995 | Herberle |
| 5,459,660 A | 10/1995 | Berra |
| 5,495,469 A | 2/1996 | Halter et al. |
| 5,499,247 A | 3/1996 | Matsuda et al. |
| 5,586,266 A | 12/1996 | Hershey et al. |
| 5,621,897 A | 4/1997 | Boury et al. |
| 5,684,803 A | 11/1997 | Nguyen Thuy |
| 5,734,847 A | 3/1998 | Garbus et al. |
| 5,748,675 A | 5/1998 | Hormel et al. |
| 5,774,680 A | 6/1998 | Wanner et al. |
| 5,787,132 A | 7/1998 | Kishigami et al. |
| 5,832,207 A | 11/1998 | Little et al. |
| 5,978,860 A | 11/1999 | Chan et al. |
| 6,094,699 A | 7/2000 | Surugucchi et al. |
| 6,141,708 A | 10/2000 | Tavallaei et al. |
| 6,189,063 B1 | 2/2001 | Rekeita et al. |
| 6,292,705 B1 | 9/2001 | Wang et al. |
| 6,308,255 B1 | 10/2001 | Gorishek, IV et al. |
| 6,310,408 B1 | 10/2001 | Hermann |
| 6,360,291 B1 | 3/2002 | Tavallaei |
| 6,397,279 B1 | 5/2002 | Jaramillo et al. |
| 6,408,163 B1 | 6/2002 | Fik |
| 6,484,268 B2 | 11/2002 | Tamura et al. |
| 6,985,990 B2 | 1/2006 | Bronson et al. |
| 7,197,589 B1 | 3/2007 | Deneroff et al. |
| 7,519,005 B2 | 4/2009 | Hejdeman et al. |
| 7,685,320 B1 | 3/2010 | Wishneusky |
| 7,729,427 B2 | 6/2010 | Kwok |
| 8,509,318 B2 | 8/2013 | Tailliet |
| 8,694,710 B2 | 4/2014 | Bas et al. |
| 8,775,707 B2 | 7/2014 | Poulsen |
| 9,152,598 B2 | 10/2015 | Fosse et al. |
| 9,166,584 B1 | 10/2015 | Kandala et al. |
| 9,252,900 B2 | 2/2016 | Poulsen |
| 9,430,321 B2 | 8/2016 | Slik |
| 9,519,612 B2 | 12/2016 | Hietala et al. |
| 9,569,386 B2 | 2/2017 | Du |
| 9,639,500 B2 | 5/2017 | Bas et al. |
| 9,652,451 B2 | 5/2017 | Elder |
| 9,690,725 B2 | 6/2017 | Sengoku |
| 9,755,821 B2 | 9/2017 | Jang et al. |
| 9,946,677 B2 | 4/2018 | Hapke |
| 10,176,130 B2 | 1/2019 | Ngo et al. |
| 10,185,683 B2 | 1/2019 | Ngo et al. |
| 10,558,607 B2 | 2/2020 | Ngo et al. |
| 10,599,601 B1 | 3/2020 | Ngo et al. |
| 10,983,942 B1 | 4/2021 | Ngo et al. |
| 11,113,220 B2 | 9/2021 | Ngo et al. |
| 2001/0050713 A1 | 12/2001 | Kubo et al. |
| 2004/0049619 A1 | 3/2004 | Lin |
| 2004/0100400 A1 | 5/2004 | Perelman et al. |
| 2004/0128594 A1 | 7/2004 | Elmhurst et al. |
| 2004/0221067 A1 | 11/2004 | Huang et al. |
| 2005/0012492 A1 | 1/2005 | Mihalka |
| 2005/0185665 A1 | 8/2005 | Uboldi |
| 2005/0259609 A1 | 11/2005 | Hansquine et al. |
| 2005/0289268 A1 | 12/2005 | Miller |
| 2006/0031618 A1 | 2/2006 | Hansquine et al. |
| 2006/0050694 A1 | 3/2006 | Bury et al. |
| 2006/0087307 A1 | 4/2006 | De Winter |
| 2006/0152236 A1 | 7/2006 | Kim |
| 2006/0236008 A1 | 10/2006 | Asano et al. |
| 2007/0073449 A1 | 3/2007 | Kraemer et al. |
| 2008/0217076 A1 | 9/2008 | Kraemer et al. |
| 2009/0121825 A1 | 5/2009 | Har |
| 2009/0248932 A1 | 10/2009 | Taylor et al. |
| 2010/0122103 A1 | 5/2010 | Roohparvar et al. |
| 2010/0305723 A1 | 12/2010 | Koyama |
| 2010/0306430 A1 | 12/2010 | Takahashi |
| 2011/0035632 A1 | 2/2011 | Hong et al. |
| 2011/0113171 A1 | 5/2011 | Radhakrishnan et al. |
| 2012/0027104 A1 | 2/2012 | Bas et al. |
| 2012/0030753 A1 | 2/2012 | Bas et al. |
| 2012/0161802 A1 | 6/2012 | Lebourg et al. |
| 2012/0226965 A1 | 9/2012 | Hammerschmidt et al. |
| 2012/0303836 A1 | 11/2012 | Ngo et al. |
| 2013/0054850 A1 | 2/2013 | Co |
| 2013/0124763 A1 | 5/2013 | Kessler |
| 2013/0128724 A1 | 5/2013 | Farley et al. |
| 2013/0132624 A1 | 5/2013 | Chen et al. |
| 2013/0166801 A1 | 6/2013 | Chun et al. |
| 2013/0197920 A1 | 8/2013 | Lesso et al. |
| 2013/0265884 A1 | 10/2013 | Brombal et al. |
| 2013/0301689 A1 | 11/2013 | Marchand et al. |
| 2014/0025999 A1 | 1/2014 | Kessler |
| 2014/0112339 A1 | 4/2014 | Safranek et al. |
| 2014/0281593 A1 | 9/2014 | Hayes |
| 2014/0304442 A1 | 10/2014 | Hietala et al. |
| 2014/0310436 A1 | 10/2014 | Du |
| 2014/0376278 A1 | 12/2014 | Fornage et al. |
| 2015/0056941 A1 | 2/2015 | Lin et al. |
| 2015/0074306 A1 | 3/2015 | Ayyagari et al. |
| 2015/0097726 A1* | 4/2015 | Babitch .................. G01S 19/235 |
| | | 342/357.62 |
| 2015/0106541 A1 | 4/2015 | Southcombe et al. |
| 2015/0127862 A1 | 5/2015 | Fan et al. |
| 2015/0149673 A1 | 5/2015 | Balkan et al. |
| 2015/0169482 A1 | 6/2015 | Ngo et al. |
| 2015/0178233 A1 | 6/2015 | Guthrie et al. |
| 2015/0192974 A1 | 7/2015 | Ngo et al. |
| 2015/0193297 A1 | 7/2015 | Ngo et al. |
| 2015/0193298 A1 | 7/2015 | Ngo et al. |
| 2015/0193321 A1 | 7/2015 | Ngo et al. |
| 2015/0193373 A1 | 7/2015 | Ngo et al. |
| 2016/0050513 A1 | 2/2016 | Wang et al. |
| 2016/0124892 A1 | 5/2016 | Amarilio et al. |
| 2016/0224488 A1 | 8/2016 | Huang et al. |
| 2016/0224489 A1* | 8/2016 | Mishra .................. G06F 13/364 |
| 2016/0274185 A1 | 9/2016 | Nishikawa |
| 2017/0003344 A1 | 1/2017 | Uekusa |
| 2017/0104607 A1 | 4/2017 | Sengoku |
| 2017/0255250 A1 | 9/2017 | Ngo et al. |
| 2017/0255578 A1 | 9/2017 | Ngo et al. |
| 2017/0255579 A1 | 9/2017 | Ngo et al. |
| 2017/0277651 A1 | 9/2017 | Ngo et al. |
| 2017/0286340 A1 | 10/2017 | Ngo et al. |
| 2018/0032457 A1 | 2/2018 | Mishra et al. |
| 2018/0095119 A1 | 4/2018 | Chillara et al. |
| 2018/0217959 A1 | 8/2018 | Ngo et al. |
| 2018/0247876 A1 | 8/2018 | Kim et al. |
| 2019/0025373 A1 | 1/2019 | Bradford |
| 2019/0132013 A1 | 5/2019 | Sharma |
| 2019/0158085 A1 | 5/2019 | Rizvi et al. |
| 2019/0250876 A1 | 8/2019 | Amarilio et al. |
| 2019/0357044 A1 | 11/2019 | Park |
| 2020/0081859 A1* | 3/2020 | Mishra .................. G06F 13/4054 |
| 2020/0151131 A1 | 5/2020 | Ngo et al. |
| 2020/0334185 A1 | 10/2020 | Ngo et al. |
| 2020/0344094 A1* | 10/2020 | Mishra .................. H04L 12/40 |
| 2020/0364168 A1* | 11/2020 | Ngo .................. H04L 12/403 |
| 2020/0394046 A1 | 12/2020 | Snelgrove et al. |
| 2021/0034557 A1 | 2/2021 | Lee et al. |
| 2021/0382677 A1* | 12/2021 | Amarilio ............. G06F 13/3625 |
| 2022/0132524 A1 | 4/2022 | Mueck et al. |
| 2022/0147474 A1 | 5/2022 | Ngo et al. |
| 2022/0166644 A1 | 5/2022 | Ngo et al. |
| 2022/0244309 A1 | 8/2022 | Sirisha et al. |
| 2022/0312196 A1 | 9/2022 | Guo et al. |

FOREIGN PATENT DOCUMENTS

| | | |
|---|---|---|
| CN | 103870415 A | 6/2014 |
| CN | 104350700 A | 2/2015 |
| EP | 2466481 A1 | 6/2012 |
| WO | 2022081263 A1 | 4/2022 |

OTHER PUBLICATIONS

Extended European Search Report for European Patent Application

(56) References Cited

OTHER PUBLICATIONS

No. 22210008.3, mailed Apr. 25, 2023, 7 pages.
Extended European Search Report for European Patent Application No. 23152712.8, mailed Apr. 24, 2023, 11 pages.
First Office Action for Chinese Patent Application No. 202080020865.8, mailed Jan. 12, 2024, 12 pages.
Examination Report for European Patent Application No. 20703620.3, mailed Dec. 12, 2023, 5 pages.
Final Office Action for U.S. Appl. No. 17/545,113, mailed Feb. 6, 2024, 30 pages.
Non-Final Office Action for U.S. Appl. No. 14/575,491, mailed May 26, 2017, 20 pages.
Non-Final Office Action for U.S. Appl. No. 14/659,379, mailed Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "Maxim 1-Wire® Tutorial," Maxim, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/575,491, mailed Nov. 30, 2017, 18 pages.
Non-Final Office Action for U.S. Appl. No. 14/659,292, mailed Sep. 29, 2017, 27 pages.
Final Office Action for U.S. Appl. No. 14/659,292, mailed Apr. 30, 2018, 24 pages.
Non-Final Office Action for U.S. Appl. No. 14/659,328, mailed Sep. 8, 2017, 51 pages.
Final Office Action for U.S. Appl. No. 14/659,328, mailed Mar. 20, 2018, 61 pages.
Notice of Allowance for U.S. Appl. No. 14/659,328, mailed Jul. 2, 2018, 8 pages.
Non-Final Office Action for U.S. Appl. No. 14/659,355, mailed Sep. 20, 2017, 32 pages.
Final Office Action for U.S. Appl. No. 14/659,355, mailed Apr. 17, 2018, 11 pages.
Advisory Action for U.S. Appl. No. 14/659,355, mailed Jul. 5, 2018, 3 pages.
Non-Final Office Action for U.S. Appl. No. 15/467,790, mailed Jun. 28, 2018, 14 pages.
Ex Parte Quayle Action for U.S. Appl. No. 15/365,315, mailed Jul. 26, 2018, 7 pages.
Final Office Action for U.S. Appl. No. 14/659,379, mailed Oct. 18, 2017, 44 pages.
Advisory Action for U.S. Appl. No. 14/659,379, mailed Feb. 26, 2018, 3 pages.
Notice of Allowance for U.S. Appl. No. 14/659,379, mailed Mar. 20, 2018, 10 pages.
Non-Final Office Action for U.S. Appl. No. 14/659,371, mailed Sep. 25, 2017, 23 pages.
Final Office Action for U.S. Appl. No. 14/659,371, mailed May 3, 2018, 21 pages.
Advisory Action for U.S. Appl. No. 14/659,371, mailed Aug. 1, 2018, 3 pages.
Non-Final Office Action for U.S. Appl. No. 14/659,292, mailed Dec. 21, 2018, 23 pages.
Final Office Action for U.S. Appl. No. 14/659,292, mailed Jun. 4, 2019, 24 pages.
Non-Final Office Action for U.S. Appl. No. 14/659,355, mailed Oct. 12, 2018, 8 pages.
Final Office Action for U.S. Appl. No. 14/659,355, mailed May 2, 2019, 8 pages.
Non-Final Office Action for U.S. Appl. No. 15/886,209, mailed May 17, 2019, 7 pages.
Non-Final Office Action for U.S. Appl. No. 14/659,371, mailed Feb. 26, 2019, 22 pages.
Non-Final Office Action for U.S. Appl. No. 15/365,295, mailed Mar. 29, 2019, 15 pages.
Final Office Action for U.S. Appl. No. 15/365,295, mailed Aug. 15, 2019, 11 pages.
Final Office Action for U.S. Appl. No. 15/467,790, mailed Nov. 5, 2018, 15 pages.
Advisory Action for U.S. Appl. No. 15/467,790, mailed Feb. 26, 2019, 3 pages.
Notice of Allowance for U.S. Appl. No. 15/467,790, mailed May 20, 2019, 8 pages.
Non-Final Office Action for U.S. Appl. No. 15/443,236, mailed Nov. 16, 2018, 19 pages.
Final Office Action for U.S. Appl. No. 15/443,236, mailed May 30, 2019, 20 pages.
Notice of Allowance and Examiner-Initiated Interview Summary for U.S. Appl. No. 15/365,315, mailed Sep. 14, 2018, 9 pages.
Notice of Allowance for U.S. Appl. No. 15/472,756, mailed Aug. 8, 2018, 8 pages.
Notice of Allowance for U.S. Appl. No. 15/886,209, mailed Sep. 11, 2019, 7 pages.
Notice of Allowance for U.S. Appl. No. 16/402,613, mailed Nov. 4, 2019, 9 pages.
Notice of Allowance for U.S. Appl. No. 16/407,397, mailed Nov. 12, 2019, 7 pages.
Advisory Action for U.S. Appl. No. 15/365,295, mailed Nov. 6, 2019, 3 pages.
Corrected Notice of Allowance for U.S. Appl. No. 15/467,790, mailed Aug. 15, 2019, 6 pages.
Corrected Notice of Allowance for U.S. Appl. No. 15/467,790, mailed Aug. 28, 2019, 6 pages.
Notice of Allowance for U.S. Appl. No. 15/443,236, mailed Sep. 24, 2019, 8 pages.
Notice of Allowance for U.S. Appl. No. 15/365,295, mailed Feb. 25, 2020, 8 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/736,164, mailed Feb. 27, 2020, 7 pages.
Final Office Action for U.S. Appl. No. 16/736,164, mailed Jun. 2, 2020, 7 pages.
Non-Final Office Action for U.S. Appl No. 16/736,164, mailed Sep. 21, 2020, 8 pages.
Non-Final Office Action for U.S. Appl. No. 17/545,113, mailed Aug. 25, 2023, 28 pages.
Final Office Action for U.S. Appl. No. 16/736,164, mailed Jan. 11, 2021, 10 pages.
International Search Report and Written Opinion for International Patent Application No. PCT/US2020/012702, mailed Apr. 7, 2020, 17 pages.
Non-Final Office Action for U.S. Appl. No. 16/599,384, mailed Aug. 24, 2020, 8 pages.
Final Office Action for U.S. Appl. No. 16/599,384, mailed Dec. 1, 2020, 9 pages.
Non-Final Office Action for U.S. Appl. No. 16/549,116, mailed Aug. 6, 2020, 9 pages.
Final Office Action for U.S. Appl. No. 16/549,116, mailed Jan. 13, 2021, 9 pages.
Non-Final Office Action for U.S. Appl. No. 16/710,457, mailed Aug. 28, 2020, 7 pages.
Author Unknown, "IEEE Standard for Reduced-Pin and Enhanced-Functionality Test Access Point and Boundary-Scan Architecture," IEEE Std 1149.7™-2009, Feb. 10, 2010, IEEE, 1037 pages.
Kawoosa, M.S. et al., "Towards Single Pin Scan for Extremely Low Pin Count Test," 2018 31st International Conference on VLSI Design and 2018 17th International Conference on Embedded Systems (VLSID), Jan. 6-10, 2018, Pune, India, IEEE, 6 pages.
Advisory Action for U.S. Appl. No. 16/736,164, mailed Mar. 19, 2021, 3 pages.
Notice of Allowance for U.S. Appl. No. 16/736,164, mailed Apr. 29, 2021, 8 pages.
Advisory Action for U.S. Appl. No. 16/549,116, mailed Mar. 24, 2021, 3 pages.

(56) References Cited

OTHER PUBLICATIONS

Non-Final Office Action and Examiner-Initiated Interview Summary for U.S. Appl. No. 16/549,116, mailed May 12, 2021, 10 pages.
Applicant-Initiated Interview Summary for U.S. Appl. No. 16/549,116, mailed Aug. 18, 2021, 2 pages.
Notice of Allowance and Examiner-Initiated Interview Summary for U.S. Appl. No. 16/549,116, mailed Sep. 14, 2021, 15 pages.
Non-Final Office Action for U.S. Appl. No. 17/095,204, mailed Oct. 14, 2021, 8 pages.
Notice of Allowance for U.S. Appl. No. 17/095,204, mailed Mar. 17, 2022, 7 pages.
Non-Final Office Action for U.S. Appl. No. 17/102,510, mailed Mar. 18, 2022, 12 pages.
International Search Report and Written Opinion for International Patent Application No. PCT/US2021/047854, mailed Dec. 13, 2021, 13 pages.
Notice of Allowance for U.S. Appl. No. 17/552,497, mailed Feb. 22, 2023, 8 pages.
Advisory Action for U.S. Appl. No. 17/545,113, mailed Apr. 3, 2024, 3 pages.
Notice of Allowance for U.S. Appl. No. 17/545,113, mailed May 1, 2024, 9 pages.
Non-Final Office Action for U.S. Appl. No. 18/044,257, mailed Aug. 22, 2024, 18 pages.

\* cited by examiner

SLAVE-INITIATED COMMUNICATIONS OVER A SINGLE-WIRE BUS

RELATED APPLICATIONS

This application claims the benefit of U.S. provisional patent application Ser. No. 63/301,213, filed on Jan. 20, 2022, the disclosure of which is hereby incorporated herein by reference in its entirety.

FIELD OF THE DISCLOSURE

The technology of the disclosure relates generally to slave-initiated communications over a single-wire bus consisting of one wire.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a mobile communication device may employ a power amplifier(s) to amplify a radio frequency (RF) signal(s) to a higher output power prior to radiating the RF signal via an antenna(s).

In many mobile communication devices, the power amplifier(s) and the antenna(s) are typically located in an RF front-end (RFFE) circuit communicatively coupled to a transceiver circuit(s) via an RFFE bus as defined in the MIPI® alliance specification for radio frequency front-end control interface, version 2.1. However, not all communications require a two-wire serial bus like the RFFE bus. In some cases, a single-wire serial bus may be sufficient or even desired for carrying out certain types of communications between circuits. As such, it may be possible to provide a single-wire bus, either concurrent to or independent of, the RFFE bus in a mobile communication device.

SUMMARY

Aspects disclosed in the detailed description are related to slave-initiated communications over a single-wire bus. In contrast to a conventional single-wire bus apparatus wherein communications over the single-wire bus are always initiated by a master circuit, a single-wire bus apparatus disclosed herein allows a slave circuit(s) to initiate communications over the single-wire bus. More specifically, multiple slave circuits can concurrently contend for access to the single-wire bus via current mode signaling (CMS). In response to the CMS asserted by the multiple slave circuits, a master circuit provides a number of pulse-width modulation (PWM) symbols over the single-wire bus to indicate which of the multiple slave circuits is granted access to the single-wire bus. By supporting slave-initiated communications over the single-wire bus, it is possible to improve efficiency, cost, and power consumption in an electronic device (e.g., smartphone) wherein the single-wire bus apparatus is deployed.

In an aspect, a single-wire bus apparatus is provided. The single-wire bus apparatus includes a single-wire bus consisting of one wire. The single-wire bus apparatus also includes multiple slave circuits each coupled to the single-wire bus and uniquely identified by a unique slave identification (USID) comprising multiple bits. One or more slave circuits among the multiple slave circuits are each configured to assert a wakeup CMS on the single-wire bus to indicate a request to communicate a data telegram over the single-wire bus in response to a respective data trigger. The one or more slave circuits among the multiple slave circuits are also each configured to receive multiple PWM symbols via the single-wire bus in response to asserting the wakeup CMS. The one or more slave circuits among the multiple slave circuits are also each configured to determine whether the request is successful based on the multiple received PWM symbols. The one or more slave circuits among the multiple slave circuits are also each configured to communicate the data telegram over the single-wire bus in response to determining that the request is successful.

In another aspect, a method for supporting slave-initiated communications over a single-wire bus is provided. The method includes asserting a wakeup CMS on the single-wire bus to indicate a request to communicate a data telegram over the single-wire bus in response to a respective data trigger. The method also includes receiving a plurality of PWM symbols via the single-wire bus in response to asserting the wakeup CMS. The method also includes determining whether the request is successful based on the plurality of received PWM symbols. The method also includes communicating the data telegram over the single-wire bus in response to determining that the request is successful.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1A:
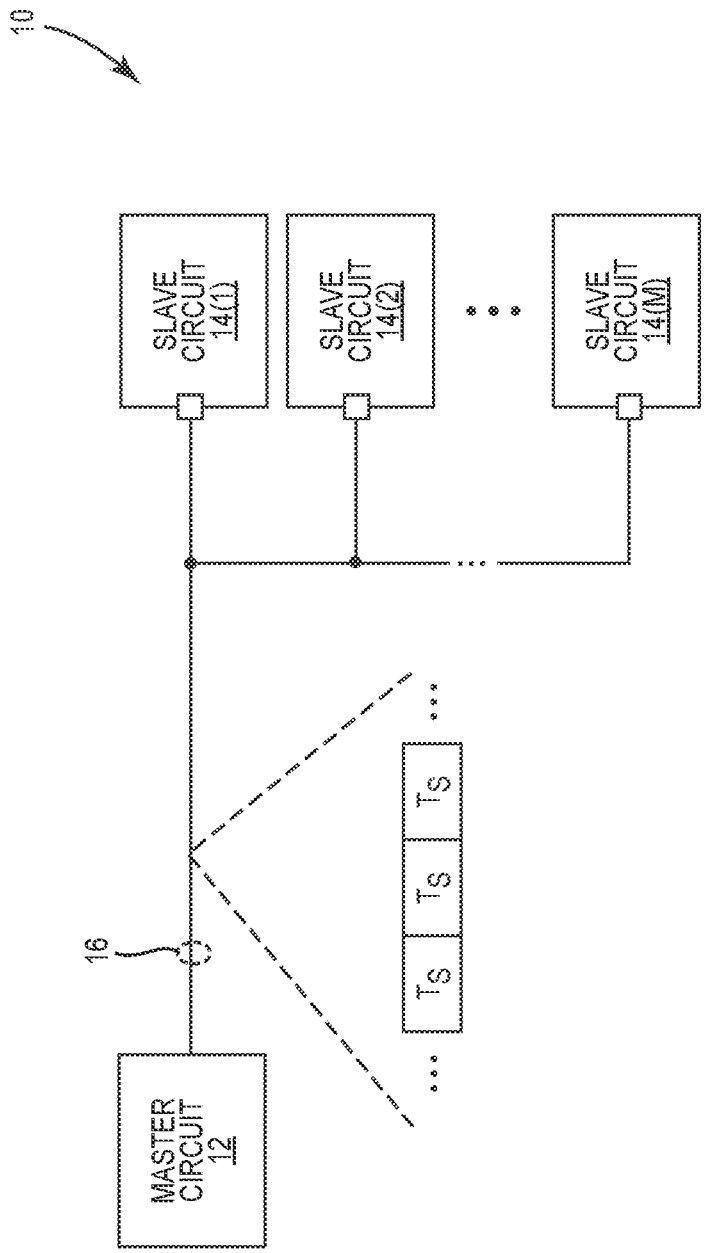
FIG. 1A is a schematic diagram of an exemplary conventional single-wire bus apparatus in which a master circuit is configured to initiate communications with a number of slave circuits over a single-wire bus.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description are related to slave-initiated communications over a single-wire bus. In contrast to a conventional single-wire bus apparatus wherein communications over the single-wire bus are always initiated by a master circuit, a single-wire bus apparatus disclosed herein allows a slave circuit(s) to initiate communications over the single-wire bus. More specifically, multiple slave circuits can concurrently contend for access to the single-wire bus via current mode signaling (CMS). In response to the CMS asserted by the multiple slave circuits, a master circuit provides a number of pulse-width modulation (PWM) symbols over the single-wire bus to indicate which of the multiple slave circuits is granted access to the single-wire bus. By supporting slave-initiated communications over the single-wire bus, it is possible to improve efficiency, cost, and power consumption in an electronic device (e.g., smartphone) wherein the single-wire bus apparatus is deployed.

Figures 1B, 1C:
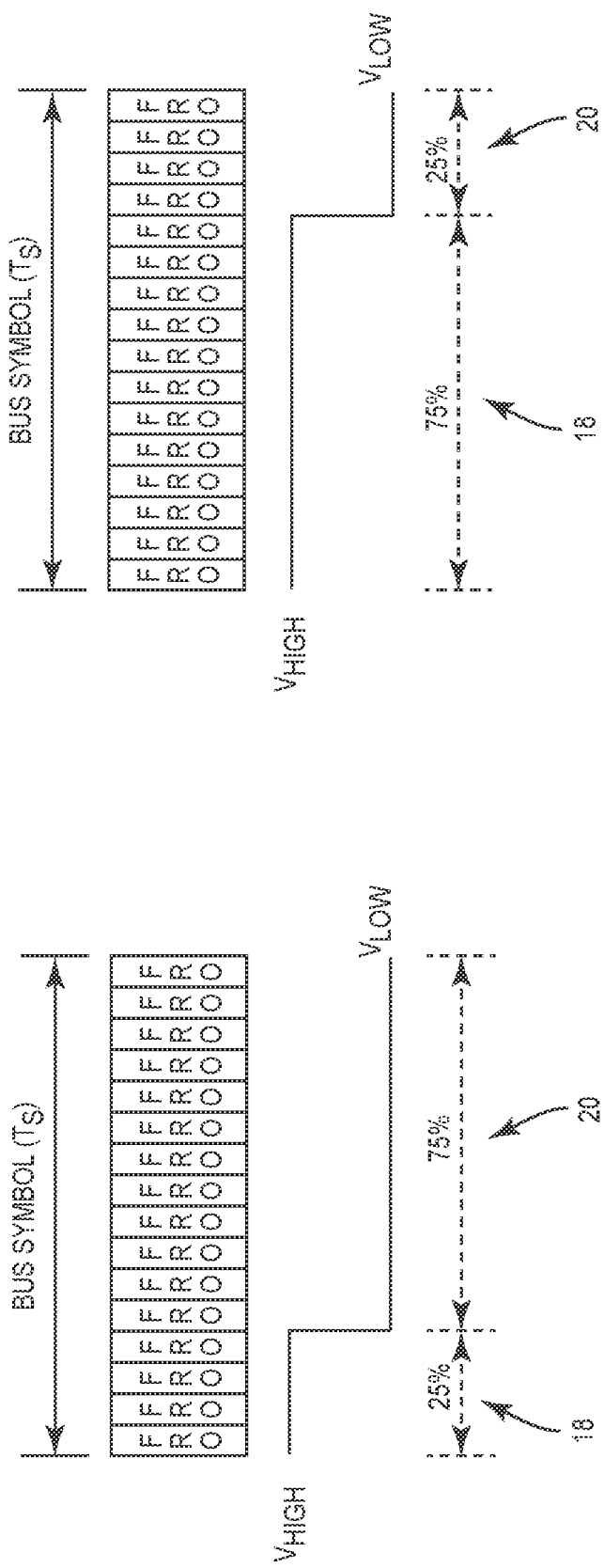
FIG. 1B is a schematic diagram providing an exemplary illustration of a bus symbol modulated based on voltage pulse-width modulation (PWM) to represent a binary value zero ("0")
FIG. 1C is a schematic diagram providing an exemplary illustration of a bus symbol modulated based on voltage PWM to represent a binary value one ("1")
Figure 2:
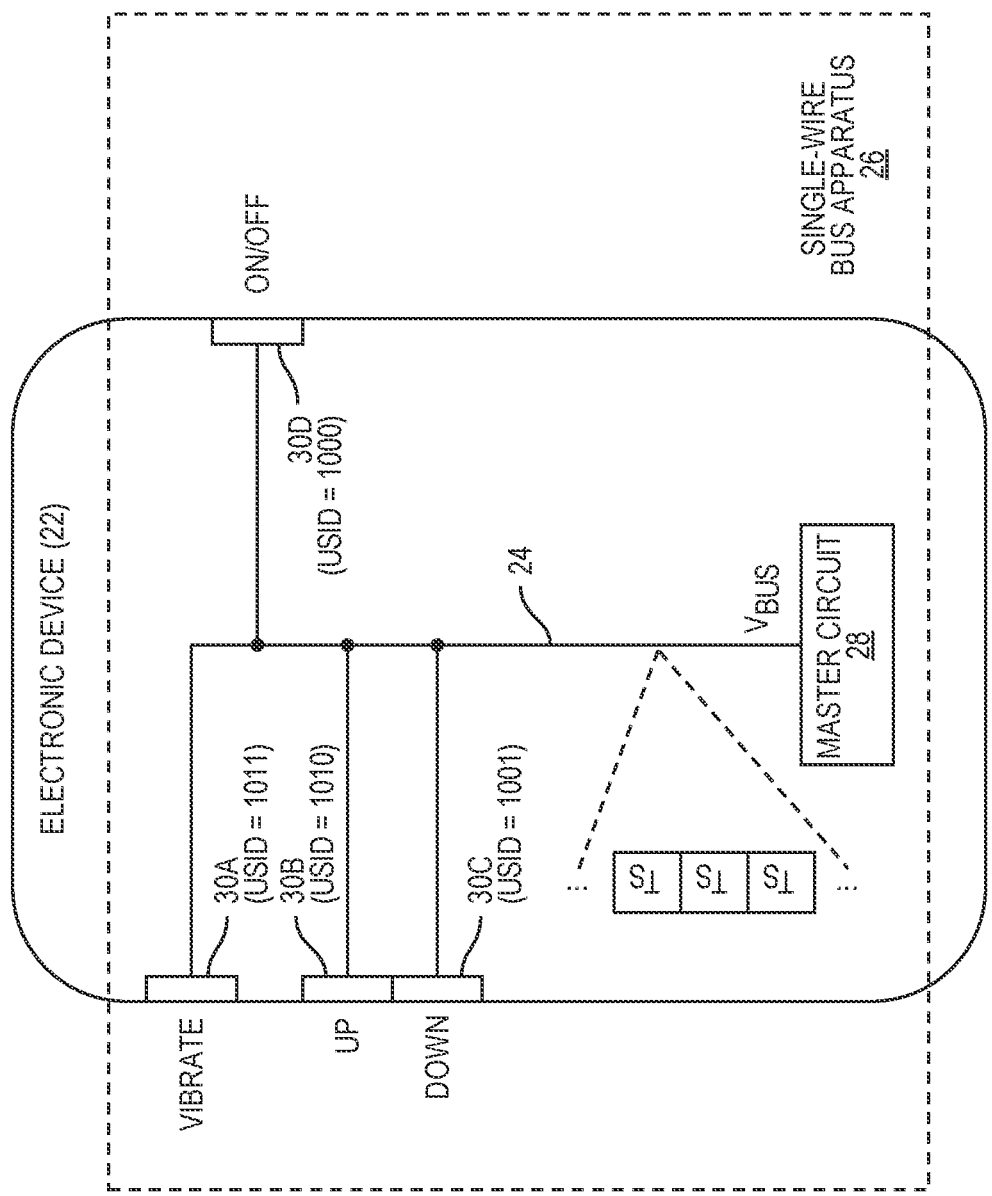
FIG. 2 is a schematic diagram of an exemplary electronic device that demands slave-initiated communications over a single-wire bus.

Before discussing a single-wire bus apparatus of the present disclosure, starting at FIG. 2, a brief overview of a conventional single-wire bus apparatus is first provided with reference to FIGS. 1A-1C to help understand basic operations of the conventional single-wire bus and formats of a PWM symbol.

In this regard, FIG. 1A is a schematic diagram of an exemplary conventional single-wire bus apparatus 10 in which a master circuit 12 is configured to initiate communications with a number of slave circuits 14(1)-14(M) over a single-wire bus 16, which consists of one conductive wire. Given that the master circuit 12 is configured to always initiate a bus telegram communication over the single-wire bus 16, the conventional single-wire bus apparatus 10 is also known as a "master-slave bus architecture." The slave circuits 14(1)-14(M) may provide a data payload(s) to the master circuit 12 over the single-wire bus 16 in response to receiving a bus telegram(s) from the master circuit 12.

Each of the slave circuits 14(1)-14(M) is uniquely identified by a respective unique slave identification (USID) that includes multiple bits (e.g., 4 bits). In this regard, the master circuit 12 can initiate a communication with any of the slave circuits 14(1)-14(M) by addressing a bus command sequence to the respective USID. Accordingly, one of the slave circuits 14(1)-14(M) identified by the respective USID can communicate a data payload(s) back to the master circuit 12.

In the conventional single-wire bus apparatus 10, the master circuit 12 is configured to communicate the bus command sequence to the slave circuits 14(1)-14(M), and the slave circuits 14(1)-14(M) are each configured to communicate the data payload(s) to the master circuit 12, based on a series of bus symbols $T_S$, which are modulated based on voltage PWM, as illustrated in FIGS. 1B and 1C. FIG. 1B is a schematic diagram providing an exemplary illustration of a bus symbol $T_S$ modulated based on voltage PWM to represent a binary value zero ("0").

In an embodiment, the bus symbol $T_S$ is modulated based on a predefined high-voltage interval 18 and a predefined low-voltage interval 20 that are configured according to a predefined configuration ratio. To represent the binary value "0," the predefined high-voltage interval 18 is shorter than the predefined low-voltage interval 20. For example, the bus symbol $T_S$ can include sixteen (16) free-running oscillators (FROs) or 16 digitally controlled oscillators (DCOs) and the predefined configuration ratio between the predefined high-voltage interval 18 and the predefined low-voltage interval 20 is 25% to 75% (or 1 to 3). In a non-limiting example, the FROs are derived from a local clock running in the slave circuits 14(1)-14(M) and the DCOs are derived from a clock running at the master circuit 12. Accordingly, the predefined high-voltage interval 18 lasts for four (4) FROs or DCOs and the predefined low-voltage interval 20 lasts for twelve (12) FROs or DCOs.

In this regard, to modulate the bus symbol $T_S$ to represent the binary value "0," a high bus voltage $V_{HIGH}$ is first asserted on the single-wire bus 16 for the predefined high-voltage interval 18 and then a lower bus voltage $V_{LOW}$ is asserted on the single-wire bus 16 for the predefined low-voltage interval 20.

FIG. 1C is a schematic diagram providing an exemplary illustration of a bus symbol $T_S$ modulated to represent a binary value one ("1"). Common elements between FIGS. 1B and 1C are shown therein with common element numbers and will not be re-described herein.

To represent the voltage PWM value "1," the predefined high-voltage interval 18 is longer than the predefined low-voltage interval 20. Based on the same example in FIG. 1B, the predefined high-voltage interval 18 lasts for 12 FROs or DCOs and the predefined low-voltage interval 20 lasts for 4 FROs or DCOs. Accordingly, to modulate the bus symbol $T_S$ to represent the binary value "1," a higher bus voltage $V_{HIGH}$ is first asserted on the single-wire bus 16 for the predefined high-voltage interval 18 and then a lower bus voltage $V_{LOW}$ is asserted on the single-wire bus 16 for the predefined low-voltage interval 20.

In the conventional single-wire bus apparatus 10, communication over the single-wire bus 16 is always initiated by the master circuit 12. In this regard, the master circuit 12 must have the knowledge as to when and what to communicate with the slave circuits 14(1)-14(M) before initiating communications with any of the slave circuits 14(1)-14(M). However, in some implementations, only the slave circuits 14(1)-14(M) have the knowledge as to when and what to communicate over the single-wire bus 16. As such, it is desirable to let any of the slave circuits 14(1)-14(M) initiate communications with the master circuit 12 over the single-wire bus 16.

FIG. 2 is a schematic diagram of an exemplary electronic device 22 that demands slave-initiated communications over a single-wire bus 24. Herein, the single-wire bus 24 is functionally equivalent to the single-wire bus 16 in the conventional single-wire bus apparatus 10 of FIG. 1A. In this regard, the single-wire bus 24 also includes only one conductive wire and can convey a series of bus symbols $T_S$ as modulated in FIGS. 1B and 1C.

The electronic device 22 includes a single-wire bus apparatus 26 configured according to embodiments disclosed in the present disclosure to support slave-initiated communications over the single-wire bus 24. In an embodiment, the single-wire bus apparatus 26 includes a master circuit 28 and multiple slave circuits 30A, 30B, 30C, 30D. In a non-limiting example, the slave circuits 30A, 30B, 30C, 30D correspond to a vibrate button, an up button, a down button, and an on/off button in the electronic device 22, respectively. In this regard, each of the slave circuits 30A, 30B, 30C, 30D only needs to communicate with the master circuit 28 in response to a respective data trigger (e.g., pressing of the vibrate button, the up button, the down button, and/or the on/off button), and the master circuit 28 has no knowledge as to when the vibrate button, the up button, the down button, and/or the on/off button is pressed.

Similar to the slave circuits 14(1)-14(M) in FIG. 1A, the slave circuits 30A, 30B, 30C, 30D are each uniquely identified by a respective USID having multiple bits (e.g., 4 bits). In a non-limiting example, the slave circuit 30A is identified by USID "1011," the slave circuit 30B is identified by USID "1010," the slave circuit 30C is identified by USID "1001," and the slave circuit 30D is identified by USID "1000."

In embodiments disclosed hereinafter, the USID that uniquely identifies each of the slave circuits 30A, 30B, 30C, 30D also defines a priority order for accessing the single-wire bus 24 among the slave circuits 30A, 30B, 30C, 30D. More specifically, the larger the USID, the higher the priority. In this regard, the USID "1011" has a higher priority than the USID "1010," the USID "1010" has a higher priority than the USID "1001," and the USID "1001" has a higher priority than the USID "1000." Thus, by assigning the USIDs "1011," "1010," "1001," and "1000" to the slave circuits 30A, 30B, 30C, and 30D, respectively, the slave circuit 30A has a higher priority than the slave circuit 30B, the slave circuit 30B has a higher priority than the slave circuit 30C, and the slave circuit 30C has a higher priority than the slave circuit 30D for accessing the single-wire bus 24.

Notably, the slave circuits 30A, 30B, 30C, 30D are merely provided for the convenience of illustration and reference and shall not be interpreted as limiting by any means. It should be appreciated that the electronic device 22 can be configured to include other numbers and/or types of slave circuits in different implementations. For example, the slave circuits can be micro-electromechanical system (MEMS) based devices that are deployed underneath a touchscreen panel and actuated by pressure to initiate communications with the master circuit 28.

The master circuit 28 maintains the single-wire bus 24 in an idle state if none of the vibrate button, the on/off button, the up button, and the down button is pressed. In an embodiment, the master circuit 28 may pull the single-wire bus 24 high to maintain a bus voltage $V_{BUS}$ higher than zero volt ($V_{BUS} > 0$ V). Accordingly, each of the slave circuits 30A, 30B, 30C, 30D can harvest power from the master circuit 28 via the single-wire bus 24 during the idle state.

At any given time, one or more of the vibrate button, the up button, the down button, and/or the on/off button may be pressed to necessitate communications with the master circuit 28 over the single-wire bus 24. In one example, the up button and the on-off button can be concurrently pressed to take a screenshot. In another example, the up button, the down button, and the on/off button can be pressed in sequence to cause the electronic device 22 to power down.

In the example of powering down the electronic device 22, the slave circuits 30B, 30C, and 30D must communicate with the master circuit 28 over the single-wire bus 24. In this regard, the slave circuits 30B, 30C, and 30D must contend for an access to the single-wire bus 24 to thereby communicate with the master circuit 28. In response, the master circuit 28 must arbitrate and indicate which of the slave circuits 30B, 30C, and 30D will be granted access to the single-wire bus 24 at a given time. Moreover, the master circuit 28 must make sure that the slave circuits 30B, 30C, and 30D are granted access to the single-wire bus 24 in accordance with the sequence in which the up button, the down button, and the on/off button are pressed so as to cause the electronic device 22 to power down.

Figure 3:
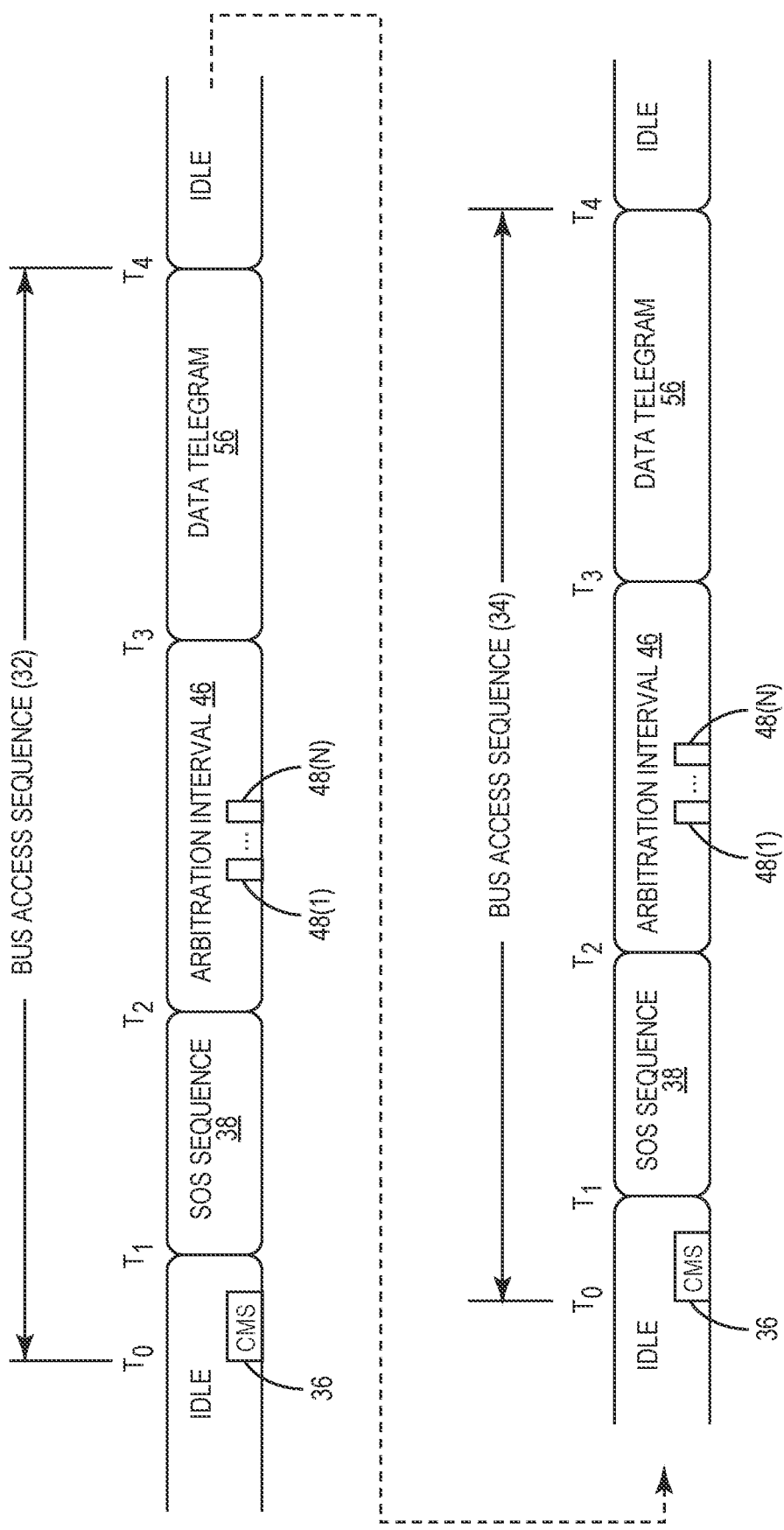
FIG. 3 is a schematic diagram providing an exemplary illustration of one or more bus access sequences that can be employed by the electronic device of FIG. 2 to enable slave-initiated communications over the single-wire bus.

According to an embodiment of the present disclosure, the slave circuits 30A, 30B, 30C, 30D may contend for, and the master circuit 28 may grant, the access to the single-wire bus 24 in accordance with predefined bus access sequences. In this regard, FIG. 3 is a schematic diagram providing an exemplary illustration of one or more bus access sequences 32, 34 that can be employed by the single-wire bus apparatus 26 in FIG. 2 to enable slave-initiated communications over the single-wire bus 24. Notably, the bus access sequences 32, 34 are shown herein merely for the purpose of illustration. It should be appreciated that the single-wire bus apparatus 26 can operate based on any number of bus access sequences as needed.

Each of the bus access sequences 32, 34 starts at time $T_0$, whereas one or more of the slave circuits 30A, 30B, 30C, 30D assert a wakeup CMS 36 to indicate a request to communicate over the single-wire bus 24. In a non-limiting example, each of the slave circuits 30A, 30B, 30C, 30D may assert the wakeup CMS 36 by pulling a current (e.g., for a duration of 3 FROs) from the master circuit 28 over the single-wire bus 24.

Figure 4:
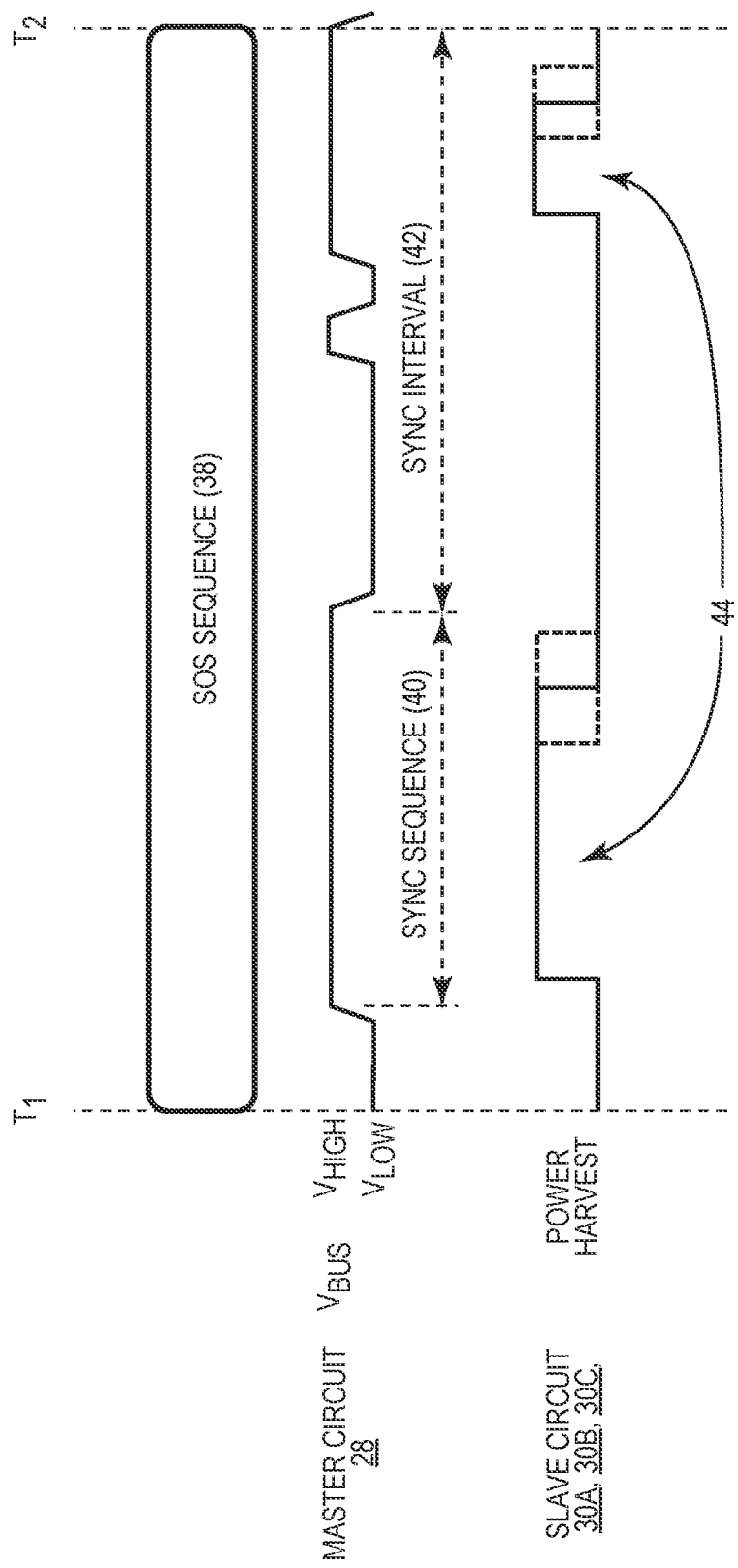
FIG. 4 is a schematic diagram providing an exemplary illustration of a start-of-sequence (SOS) sequence transmitted in each of the bus access sequences in FIG. 3.

In response to detecting the wakeup CMS 36, the master circuit 28 will transmit a start-of-sequence (SOS) sequence 38 (between time $T_1$ and $T_2$) to all of the slave circuits 30A, 30B, 30C, 30D via the single-wire bus 24. FIG. 4 is a schematic diagram providing an exemplary illustration of the SOS sequence 38 transmitted by the master circuit 28 in each of the bus access sequences 32, 34 in FIG. 3. Common elements between FIGS. 3 and 4 are shown and/or referenced therein with common element numbers and will not be re-described herein.

In an embodiment, the master circuit 28 transmits a sync sequence 40 during the SOS sequence 38. The SOS sequence 38 is a unique multi-bit pattern that can never be reproduced by any of the slave circuits 30A, 30B, 30C, 30D. Understandably, the multi-bit pattern includes a combination of PWM symbols representing binary "0s" and "1s," as previously illustrated in FIGS. 1B and 1C. Upon successful detection of the sync sequence 40, each of the slave circuits 30A, 30B, 30C, 30D will perform synchronization with the master circuit 28 during a sync interval 42. As a result, at time $T_2$, the slave circuits 30A, 30B, 30C, 30D will be able to time-align respective FROs, which are derived from respective local clocks in the slave circuits 30A, 30B, 30C, 30D, with the DCOs generated by the master circuit 28.

Additionally, the slave circuits 30A, 30B, 30C, 30D may be configured to opportunistically harvest power from the master circuit 28 via the single-wire bus 24 during reception of the sync sequence 40 and/or the sync interval 42, whenever the bus voltage $V_{BUS}$ is equal to the high bus voltage $V_{HIGH}$. For example, the slave circuits 30A, 30B, 30C, 30D can harvest power from the master circuit 28 during one or more power harvesting intervals 44. Notably, the power harvesting intervals 44 may not necessarily be started and/or ended at same time for each of the slave circuits 30A, 30B, 30C, 30D. In other words, the power harvesting intervals 44 may be of a different length for each of the slave circuits 30A, 30B, 30C, 30D.

With reference back to FIG. 3, each of the bus access sequences 32, 34 also includes an arbitration interval 46 (between time $T_2$ and $T_3$) that immediately succeeds the SOS sequence 38. During the arbitration interval 46 in each of the bus access sequences 32, 34, the master circuit 28 is configured to transmit multiple PWM symbols 48(1)-48(N) that are modulated to uniquely indicate which of the slave circuits 30A, 30B, 30C, 30D is granted access to the single-wire bus 24 during a respective one of the bus access sequences 32, 34.

Figure 5A:
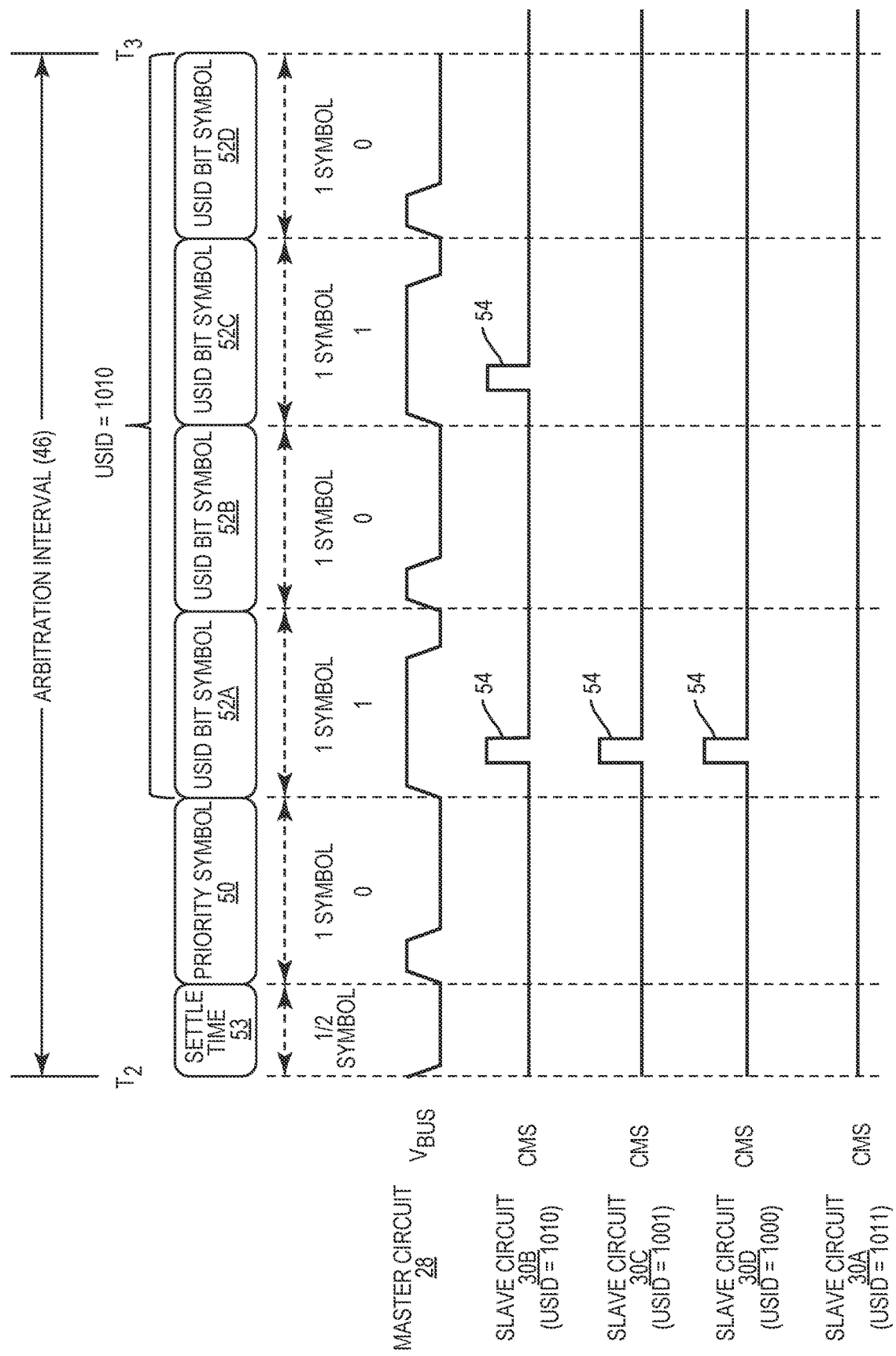
FIGS. 5A-5C are schematic diagrams providing exemplary illustrations as to how a master circuit in the electronic device of FIG. 2 grants access to the single-wire bus to one of multiple slave circuits contending for the single-wire bus.
Figure 5B:
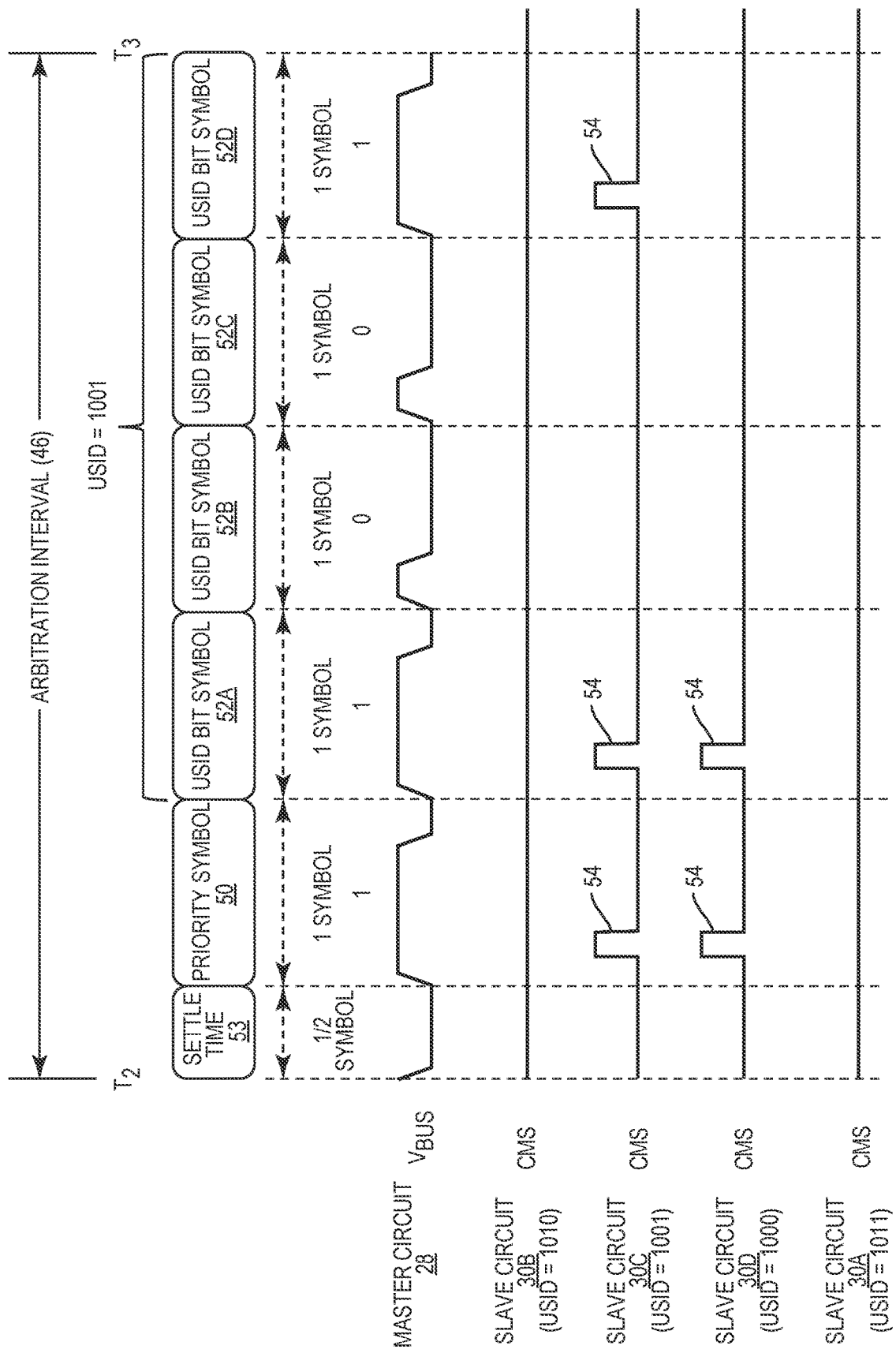
Figure 5C:
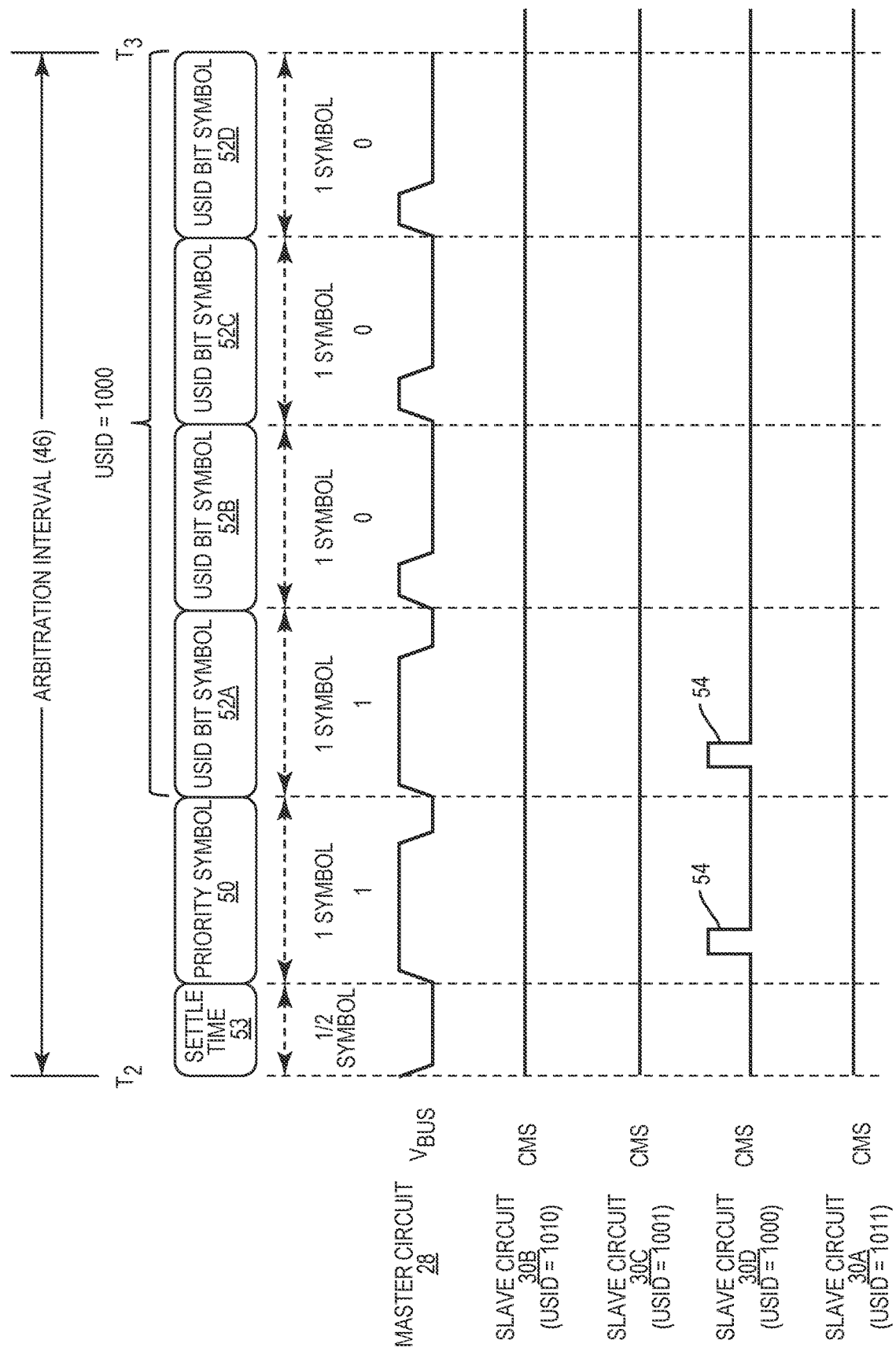

FIGS. 5A, 5B, and 5C are schematic diagrams providing exemplary illustrations as to how the master circuit 28 in the single-wire bus apparatus 26 in FIG. 2 grants access to the single-wire bus 24 to one of the slave circuits 30A, 30B, 30C, 30D contending for the single-wire bus 24. Common elements between FIGS. 3 and 5A-5C are shown and/or referenced therein with common element numbers and will not be re-described herein.

With reference to FIG. 5A, in an embodiment, the arbitration interval 46 in each of the bus access sequences 32, 34 is configured to include a priority symbol 50. In an embodiment, the USID that uniquely identifies each of the slave circuits 30A, 30B, 30C, 30D includes four (4) binary bits. Accordingly, the arbitration interval 46 is configured to include multiple USID bit symbols 52A, 52B, 52C, 52D, each representing a respective one of the binary bits in the USID. In the embodiment disclosed herein, the USID bit symbol 52A, which immediately succeeds the priority symbol 50, is configured to represent a most-significant bit (MSB) (e.g., bit #3) in the USID. Accordingly, the USID bit symbols 52B, 52C, and 52D will represent bit #2, bit #1, and bit #0 (a.k.a. least-significant bit (LSB)) in the USID, respectively. For example, the USID bit symbols 52A, 52B, 52C, 52D will collectively represent the USID "1010" if the USID bit symbols 52A, 52B, 52C, 52D are PWM modulated, as shown in FIGS. 1B and 1C, to represent binary values "1," "0," "1," "0," respectively.

The arbitration interval 46 may also include a settle time 53 that precedes the priority symbol 50. The settle time 53 may be a one-half (½) symbol in duration.

Continuing with the example of powering down the electronic device 22, the slave circuits 30B, 30C, and 30D will contend for the single-wire bus 24 in response to the up button, the down button, and the on/off button being pressed. According to an embodiment of the present disclosure, in a first attempt to access the single-wire bus 24, the slave circuits 30B, 30C, and 30D will each indicate the respective USID to the master circuit 28 via the USID bit symbols 52A, 52B, 52C, and 52D. More specifically, each of the slave circuits 30B, 30C, and 30D will assert a bit indication CMS 54 (e.g., for a duration of 2 FROs) in a respective one of the USID bit symbols 52A, 52B, 52C, and 52D if a corresponding bit in the USID has a binary value "1." It should be noted that, during the first attempt to access the single-wire bus 24, none of the slave circuits 30B, 30C, and 30D is allowed to assert the bit indication CMS 54 during the priority symbol 50.

For example, since the USID of the slave circuit 30B is "1010," the USID of the slave circuit 30C is "1001," and the USID of the slave circuit 30D is "1000," the slave circuits 32B, 32C, 32D will each assert the bit indication CMS 54 during the USID bit symbol 52A. The master circuit 28 will thus modulate the USID bit symbol 52A as illustrated in FIG. 1C to represent the binary value "1" in response to detecting the bit indication CMS 54 asserted by the slave circuits 30B, 30C, and 30D. Recall the PWM modulation examples described in FIGS. 1B and 1C, the predefined configuration ratio between the predefined high-voltage interval 18 and the predefined low-voltage interval 20 needs to be 75% to 25% to represent the binary value "1." In this regard, in one aspect, the master circuit 28 is configured to extend the predefined high-voltage interval 18 to 75% of the USID bit symbol 52A to represent the binary value "1" in response to detecting the bit indication CMS 54 asserted by the slave circuits 30B, 30C, and 30D. In another aspect, each of the slave circuits 32B, 32C, 32D needs to assert the bit indication CMS 54 as early as possible during the USID bit symbol 52A. In a non-limiting example, each of the slave circuits 32B, 32C, 32D asserts the bit indication CMS 54 during a first half of the USID bit symbol 52A.

In the USID bit symbol 52B, none of the slave circuits 30B, 30C, and 30D will assert the bit indication CMS 54 since the corresponding bit in each of the USIDs "1010," "1001," and "1000" has a binary value "0." Accordingly, the master circuit 28 will modulate the USID bit symbol 52B as illustrated in FIG. 1B to represent the binary value "0" in response to not detecting the bit indication CMS 54 during the USID bit symbol 52B.

In the USID bit symbol 52C, only the slave circuit 30B will assert the bit indication CMS 54 given that the corresponding bit in the USID "1010" once again has the binary value "1." In the meantime, the slave circuits 30C and 30D will not assert the bit indication CMS 54 because the corresponding bit in the USIDs "1001" and "1000" both have the binary value "0." Accordingly, the master circuit 28 will modulate the USID bit symbol 52C as illustrated in FIG. 1C to represent the binary value "1" in response to detecting the bit indication CMS 54 asserted by the slave circuit 30B.

As mentioned earlier, the slave circuit 30C is assigned the USID of "1001" and the slave circuit 30D is assigned the USID of "1000." As such, by modulating the USID bit symbol 52C to represent the binary value "1," the slave circuits 30C and 30D can conclude that their respective requests for the single-wire bus 24 have failed. In the meantime, the slave circuit 30B can continue to contend for the single-wire bus 24.

In the USID bit symbol 52D, the slave circuit 30B will not assert the bit indication CMS 54 since the corresponding bit in the USID "1010" has the binary value "0." The slave circuits 30C and 30D will also not assert the bit indication CMS 54 as a result of losing the request to the slave circuit 30B. Accordingly, the master circuit 28 will modulate the USID bit symbol 52D as illustrated in FIG. 1B to represent the binary value "0" in response to not detecting the bit indication CMS 54 during the USID bit symbol 52D. At this point, the master circuit 28 has modulated the USID bit symbols 52A, 52B, 52C, and 52D to collectively represent the USID "1010." As a result, at time $T_3$, the slave circuit 30B can conclude that its request for the single-wire bus 24 has been successful. The slave circuits 30C and 30D, on the other hand, must continue contending for the single-wire bus 24 in a subsequent bus access sequence.

FIG. 5B illustrates how the slave circuits 30C and 30D can contend for the single-wire bus 24 after failing a previous attempt to access the single-wire bus 24. As a second attempt to access the single-wire bus 24, the slave circuits 30C and 30D will each assert the bit indication CMS 54 during the priority symbol 50. The master circuit 28 will thus modulate the priority symbol 50 as illustrated in FIG. 1C to represent the binary value "1" in response to detecting the bit indication CMS 54 asserted by the slave circuits 30C and 30D.

Notably, the slave circuits 30A and 30B are prohibited from asserting the bit indication CMS 54 in the priority symbol 50. Moreover, the slave circuits 30A and 30B cannot assert the bit indication CMS 54 in any of the USID bit symbols 52A, 52B, 52C, 52D in response to detecting the bit indication CMS 54 in the priority symbol 50.

In the USID bit symbol 52A, the slave circuits 30C and 30D will both assert the bit indication CMS 54 since the corresponding bit in each of the USIDs "1001" and "1000" has the binary value "1." Accordingly, the master circuit 28 will thus modulate the USID bit symbol 52A to represent the binary value "1" in response to detecting the bit indication CMS 54 asserted by the slave circuits 30C and 30D. In the USID bit symbols 52B and 52C, none of the slave circuits 30C and 30D will assert the bit indication CMS 54 since the corresponding bits in each of the USIDs "1001" and "1000" has the binary value "0." Accordingly, the master circuit 28 will modulate the USID bit symbols 52B and 52C as illustrated in FIG. 1B to represent the binary value "0" in response to not detecting the bit indication CMS 54 during the USID bit symbols 52B and 52C.

In the USID bit symbol 52D, the slave circuit 30C will assert the bit indication CMS 54 given that the corresponding bit in the USID "1001" once again has the binary value "1." In the meantime, the slave circuit 30D will not assert the bit indication CMS 54 because the corresponding bit in the USID "1000" has the binary value "0." Accordingly, the master circuit 28 will modulate the USID bit symbol 52D as illustrated in FIG. 1C to represent the binary value "1" in response to detecting the bit indication CMS 54 asserted by the slave circuit 30C. Thus, by asserting the bit indication CMS 54 during the priority symbol 50 and detecting the USID bit symbols 52A, 52B, 52C, 52D that are modulated to correctively represent the USID "1001," the slave circuit 30C can conclude that its request for the single-wire bus 24 has been granted. In contrast, the slave circuit 30D can conclude that its request for the single-wire bus 24 has failed and needs to contend for the single-wire bus 24 once again in a subsequent bus access sequence.

FIG. 5C illustrates how the slave circuit 30D can contend for the single-wire bus 24 after failing two previous attempts to access the single-wire bus 24. As a third attempt to access the single-wire bus 24, the slave circuit 32D will assert the bit indication CMS 54 during the priority symbol 50. The master circuit 28 will thus modulate the priority symbol 50 as illustrated in FIG. 1C to represent the binary value "1" in response to detecting the bit indication CMS 54 asserted by the slave circuit 30D.

Notably, the slave circuits 30A, 30B, and 30C are prohibited from asserting the bit indication CMS 54 in the priority symbol 50. Moreover, the slave circuits 30A, 30B, and 30C cannot assert the bit indication CMS 54 in any of the USID bit symbols 52A, 52B, 52C, 52D in response to detecting the bit indication CMS 54 in the priority symbol 50.

In the USID bit symbol 52A, the slave circuit 30D will assert the bit indication CMS 54 since the corresponding bit in the USID "1000" has the binary value "1." Accordingly, the master circuit 28 will thus modulate the USID bit symbol 52A to represent the binary value "1" in response to detecting the bit indication CMS 54 asserted by the slave circuit 30D. In the USID bit symbols 52B, 52C, and 52D, the slave circuit 30D will not assert the bit indication CMS 54 since the corresponding bit in the USID "1000" has the binary value "0." Accordingly, the master circuit 28 will modulate the USID bit symbols 52B, 52C, and 52D as illustrated in FIG. 1B to represent the binary value "0" in response to not detecting the bit indication CMS 54 during the USID bit symbols 52B, 52C, and 52D. Thus, by asserting the bit indication CMS 54 during the priority symbol 50 and detecting the USID bit symbols 52A, 52B, 52C, 52D that are modulated to correctively represent the USID "1000," the slave circuit 30D can conclude that its request for the single-wire bus 24 has been granted. As a result, the slave circuits 30B, 30C, 30D have sequentially gained access to the single-wire bus 24 to thereby cause the electronic device 22 to shut down.

Figure 6:
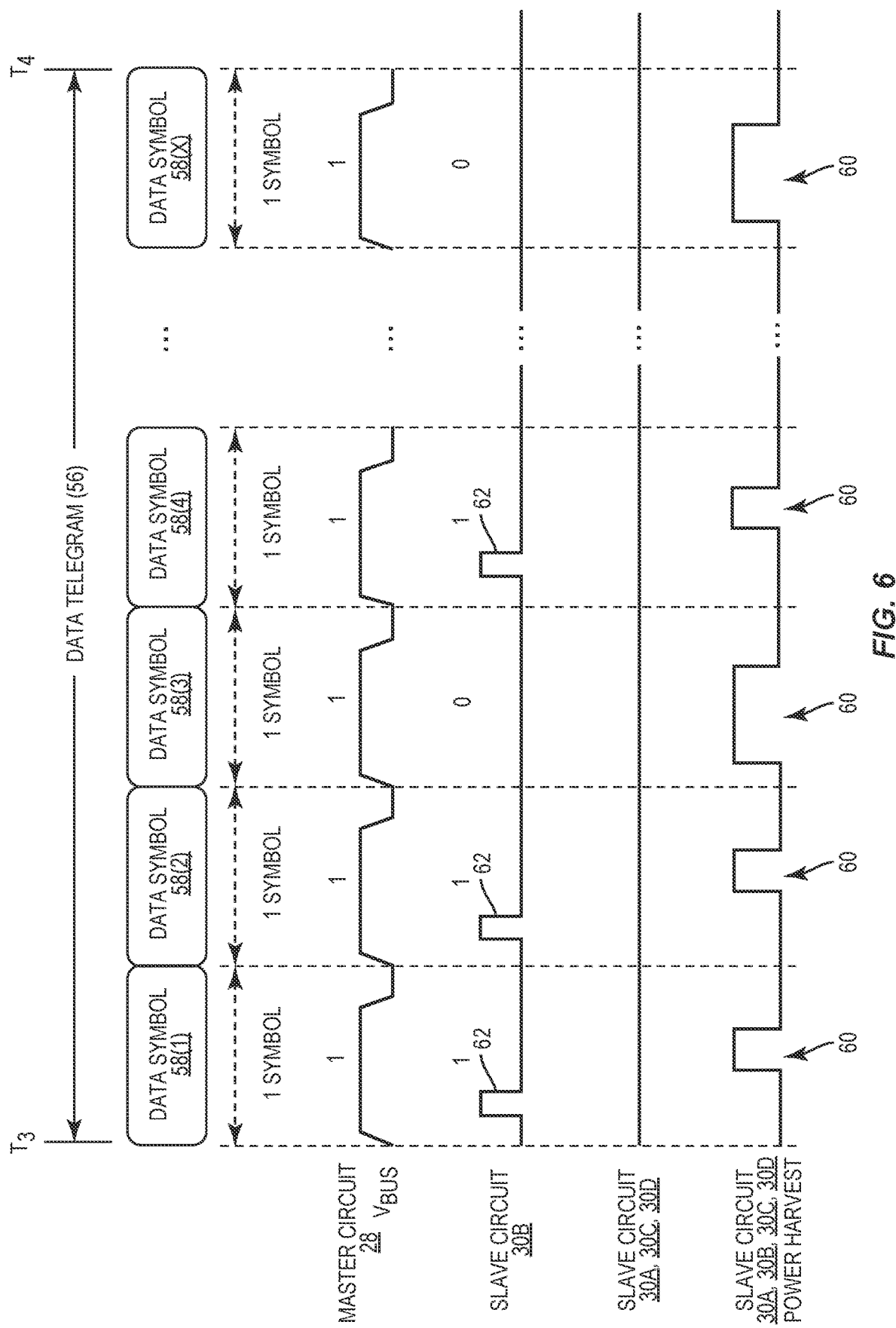
FIG. 6 is a schematic diagram providing an exemplary illustration of data telegram transmission performed by a slave circuit in the electronic device of FIG. 2 over the single-wire bus.

With reference back to FIG. 3, upon successful request for the single-wire bus 24 in a respective bus access sequence (e.g., the bus access sequence 32, 34, and so on), the slave circuits 30B, 30C, and 30D can transmit a data telegram 56 over the single-wire bus 24 (between time $T_3$ and $T_4$). In this regard, FIG. 6 is a schematic diagram providing an exemplary illustration of data telegram transmission performed by the slave circuit 30B in the single-wire bus apparatus 26 in FIG. 2 over the single-wire bus 24.

The data telegram 56 includes multiple data symbols 58(1)-58(X). In an embodiment, the master circuit 28 is configured to modulate each of the data symbols 58(1)-58(X) as the binary value "1" during the data telegram 56 (between time $T_3$ and $T_4$). Accordingly, each of the slave circuits 30A, 30B, 30C, 30D may opportunistically harvest power from the master circuit 28 during multiple power harvesting intervals 60.

The slave circuit 30B will assert a data CMS 62 if the slave circuit 30B intends to transmit a binary value "1" in any of the data symbols 58(1)-58(X). In contrast, the slave circuit 30B will not assert the data CMS 62 if the slave circuit 30B intends to transmit a binary value "0" in any of the data symbols 58(1)-58(X).

Figure 7:
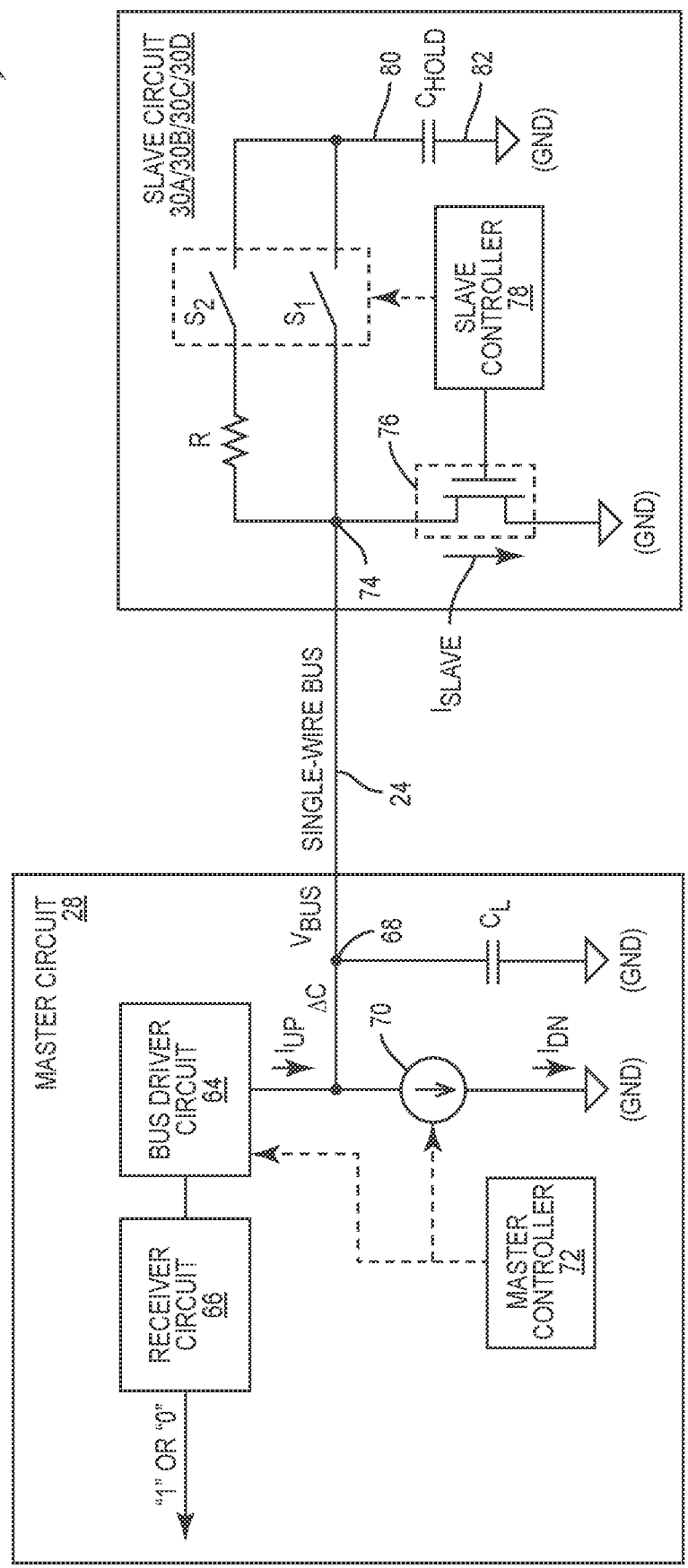
FIG. 7 is a schematic diagram of an exemplary single-wire bus apparatus configured according to embodiments described in FIGS. 3, 4, 5A-5C, and 6 to support slave-initiated communications over the single-wire bus in the electronic device of FIG. 2.

FIG. 7 is a schematic diagram providing an exemplary illustration of the single-wire bus apparatus 26 in the electronic device 22 of FIG. 2 configured according to embodiments described in FIGS. 3, 4, 5A-5C, and 6 to support slave-initiated communications over the single-wire bus 24. Common elements between FIGS. 2 and 7 are shown and/or referenced therein with common element numbers and will not be re-described herein.

The master circuit 28 includes a bus driver circuit 64 and a receiver circuit 66. The bus driver circuit 64 is coupled to the single-wire bus 24. The bus driver circuit 64 is configured to pull the single-wire bus 24 high to maintain the bus voltage $V_{BUS}$ during the idle state. The bus driver circuit 64 is also configured to detect the wakeup CMS 36 asserted by any of the slave circuits 30A, 30B, 30C, 30D and transmit the SOS sequence 38 in response to detecting the wakeup CMS 36. The bus driver circuit 64 is also configured to modulate the priority symbol 50 and the USID bit symbols 52A, 52B, 52C, 52D in the arbitration interval 46 based on the bit indication CMS 54 asserted by any of the slave circuits 30A, 30B, 30C, 30D. The bus driver circuit 64 is further configured to modulate each of the data symbols 58(1)-58(X) in the data telegram 56 to represent the binary value "1."

The receiver circuit 66 is configured to detect presence or absence of the data CMS 62 transmitted by any of the slave circuits 30A, 30B, 30C, 30D in each of the data symbols 58(1)-58(X) in the data telegram 56. Accordingly, the receiver circuit 66 can output a series of binary "1s" and/or "0s" based on detected presence or absence of the data CMS 62.

The master circuit 28 also includes a master port 68, a master current sink 70, and a master controller 72. The master port 68 is coupled to the single-wire bus 24 and the bus driver circuit 64. The master current sink 70 is coupled between the master port 68 and a ground (GND). The master controller 72, which can be a microcontroller or a microprocessor for example, is configured to control the bus driver circuit 64 and/or the master current sink 70 to cause the master circuit 28 to modulate the bus symbols $T_S$ (e.g., the sync sequence 40 in FIG. 4, the priority symbol 50 and the USID bit symbols 52A, 52B, 52C, 52D in FIGS. 5A-5C, and the data symbols 58(1)-58(X) in FIG. 6) in accordance with the PWM modulation as shown in FIGS. 1B and 1C.

The master circuit 28 may also include an electromagnetic interference (EMI) capacitor CL coupled between the master port 68 and the GND. Notably, the EMI capacitor CL corresponds to a total EMI capacitance of the single-wire bus 24, which may vary depending on the number of slave circuits, any added capacitance, and effective capacitance increases due to increased length of the single-wire bus 24.

In one embodiment, the bus driver circuit 64 can be a low dropout (LDO) master current source. To assert the bus voltage $V_{BUS}$ at the low bus voltage $V_{LOW}$, the master controller 72 is configured to activate the master current sink 70 to induce a sink current IDN to thereby modulate any of the bus symbols $T_S$ (as shown in FIG. 1B) to represent the binary value "0." In contrast, to raise the bus voltage $V_{BUS}$ to the high bus voltage $V_{HIGH}$, the master controller 72 is configured to deactivate the master current sink 70. Accordingly, the bus driver circuit 64 will provide a source current $I_{UP}$ to thereby modulate any of the bus symbols $T_S$ (as shown in FIG. 1C) to represent the binary value "1."

Each of the slave circuits 30A, 30B, 30C, 30D includes a slave port 74, a slave current sink 76, a holding capacitor $C_{HOLD}$, and a slave controller 78. The slave port 74 is coupled to the single-wire bus 24. The slave current sink 76, which can be an N-type transistor for example, is coupled between the slave port 74 and the GND. When the slave current sink 76 is activated, the slave current sink 76 draws a slave current $I_{SLAVE}$ from the master circuit 28. The bus driver circuit 64 provides a minimal source current $I_{UP}$ and pulls up the single-wire bus 24 during the idle state. When any of the slave circuits 30A, 30B, 30C, 30D pulls down the single-wire bus 24 to try to initiate a communication, it is equivalent to receiving data from the slave circuits 30A, 30B, 30C, 30D using the receiver circuit 66. The bus driver circuit 64 may provide a voltage indication to the receiver circuit 66 when the source current $I_{UP}$ is pulled down.

In this regard, each of the slave circuit 30A, 30B, 30C, 30D can assert the wakeup CMS 36, the bit indication CMS 54, and the data CMS 62 over the single-wire bus 24 by activating the slave current sink 76 (e.g., for different durations) to thereby cause the receiver circuit 66 to receive the bit indication CMS 54, and the data CMS 62. Accordingly, the bus driver circuit 64 in the master circuit 28 can detect the wakeup CMS 36, the bit indication CMS 54, and the data CMS 62 and provide corresponding data to the receiver circuit 66.

The holding capacitor $C_{HOLD}$ has a first end 80 coupled to the slave port 74 via a charge switch $S_1$ and a second end 82 coupled to the GND. The slave controller 78, which can be a microcontroller or a microprocessor for example, is coupled to the slave current sink 76 and the charge switch $S_1$. The charge switch $S_1$ will be closed during the power harvesting intervals 44 (as shown in FIG. 4) and/or the power harvesting intervals 60 (as shown in FIG. 6) to harvest power from the master circuit 28 to charge up the holding capacitor $C_{HOLD}$.

Each of the slave circuits 30A, 30B, 30C, 30D also includes an idle switch $S_2$ and a resistor R that are coupled in series between the slave port 74 and the first end 80 of the holding capacitor $C_{HOLD}$. The idle switch $S_2$ is closed when the single-wire bus 24 is in the idle state and opened otherwise. When the idle switch $S_2$ is closed, each of the slave circuits 30A, 30B, 30C, 30D can harvest power from the master circuit 28 to charge up the holding capacitor $C_{HOLD}$. In contrast, when the idle switch $S_2$ is opened, the holding capacitor $C_{HOLD}$ will be discharged to supply power to a respective one of the slave circuits 30A, 30B, 30C, 30D.

Figure 8:
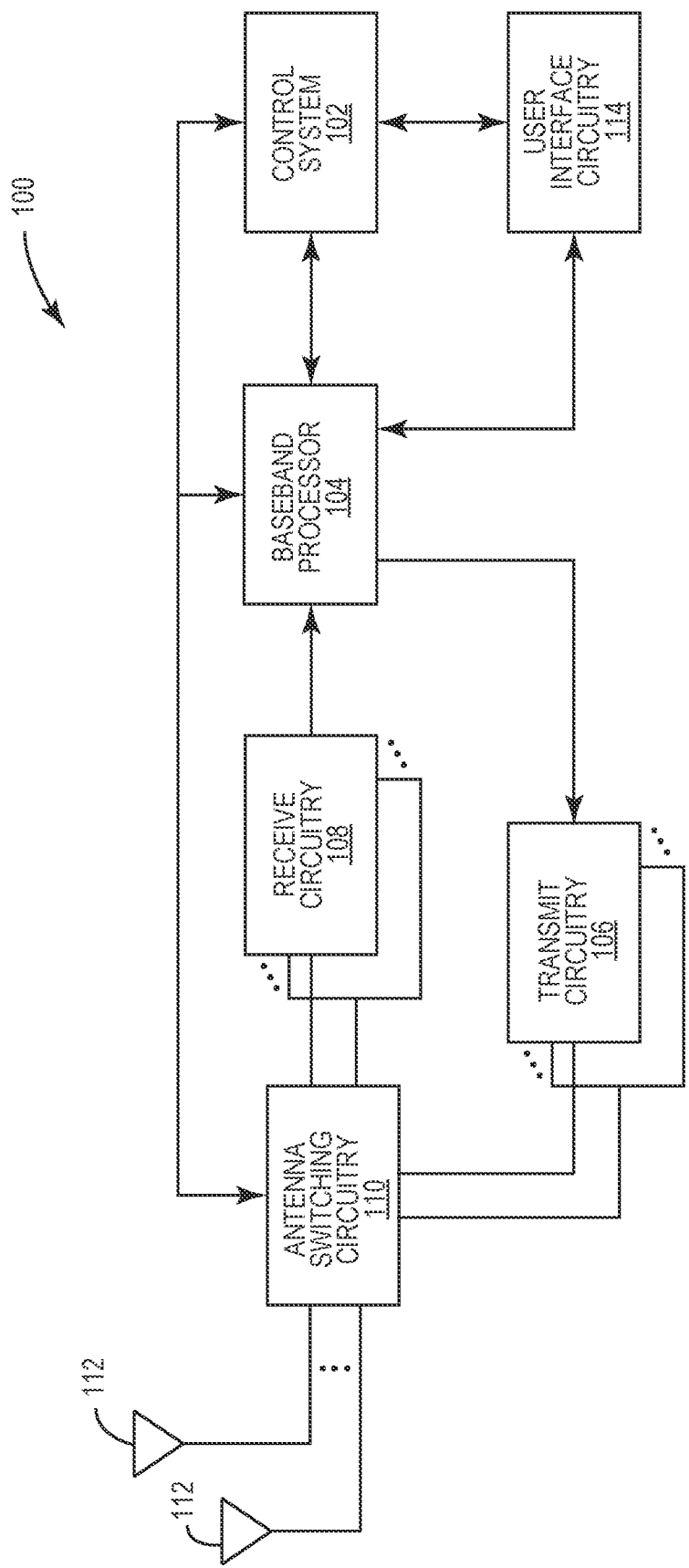
FIG. 8 is a schematic diagram of an exemplary user element wherein the single-wire bus apparatus of FIG. 7 can be provided to support slave-initiated communications over the single-wire bus in the electronic device of FIG. 2.

The single-wire bus apparatus 26 of FIG. 7 can be provided in a user element to support slave-initiated communications over the single-wire bus 24 according to embodiments described above. In this regard, FIG. 8 is a schematic diagram of an exemplary user element 100 wherein the single-wire bus apparatus 26 of FIG. 7 can be provided to support slave-initiated communications over the single-wire bus 24 in the electronic device 22 of FIG. 2.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

Figure 9:
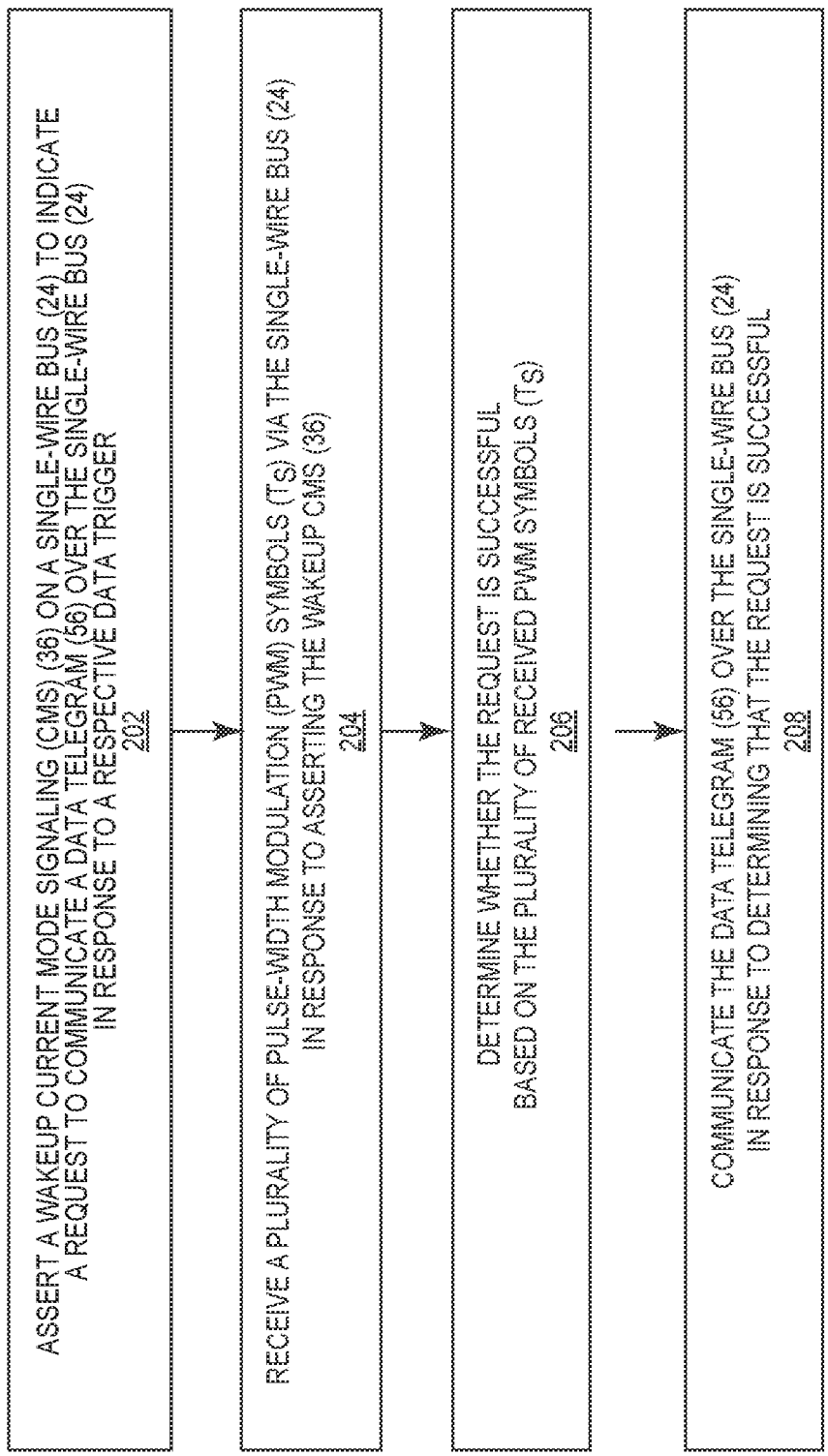
FIG. 9 is a flowchart of an exemplary process that can be employed by the single-wire bus apparatus of FIG. 7 to support slave-initiated communications over the single-wire bus in the electronic device of FIG. 2.

The single-wire bus apparatus 26 of FIG. 7 can be further configured to support slave-initiated communications over the single-wire bus 24 according to a process. In this regard, FIG. 9 is a flowchart of an exemplary process 200 that can be employed by the single-wire bus apparatus 26 of FIG. 7 to support slave-initiated communications over the single-wire bus 24 in the electronic device 22 of FIG. 2.

Herein, any of the slave circuits 30A, 30B, 30C, 30D can assert the wakeup CMS 36 on the single-wire bus 24 to indicate a request to communicate the data telegram 56 over the single-wire bus 24 in response to a respective data trigger (step 202). Accordingly, any of the slave circuits 30A, 30B, 30C, 30D can receive the PWM symbols ($T_S$) via the single-wire bus 24 in response to asserting the wakeup CMS 36 (step 204). Subsequently, any of the slave circuits 30A, 30B, 30C, 30D can determine whether the request is successful based on the received PWM symbols ($T_S$) (step 206). Any of the slave circuits 30A, 30B, 30C, 30D is configured to communicate the data telegram 56 over the single-wire bus 24 in response to determining that the request is successful (step 208).

Those skilled in the art will recognize improvements and modifications to the embodiments of the present disclosure. All such improvements and modifications are considered within the scope of the concepts disclosed herein and the claims that follow.

What is claimed is:

1. A single-wire bus apparatus comprising:
 a master circuit coupled to a single-wire bus consisting of one wire; and
 a plurality of slave circuits each coupled to the single-wire bus and uniquely identified by a unique slave identification (USID) comprising multiple bits;
 wherein one or more slave circuits among the plurality of slave circuits are each configured to:
  assert a wakeup current mode signaling (CMS) on the single-wire bus to indicate a request to communicate a data telegram over the single-wire bus in response to a respective data trigger unknown to the master circuit;
  receive a plurality of pulse-width modulation (PWM) symbols via the single-wire bus in response to asserting the wakeup CMS;
  determine whether the request is successful based on the plurality of received PWM symbols; and
  communicate the data telegram over the single-wire bus in response to determining that the request is successful.

2. The single-wire bus apparatus of claim 1, wherein the master circuit is configured to:
 detect the wakeup CMS asserted by the one or more slave circuits;
 transmit a start-of-sequence (SOS) sequence over the single-wire bus in response to detecting the wakeup CMS asserted by the one or more slave circuits; and
 transmit the plurality of PWM symbols via the single-wire bus in an arbitration interval after transmitting the SOS sequence.

3. The single-wire bus apparatus of claim 2, wherein the plurality of PWM symbols comprises a priority symbol and a plurality of USID bit symbols succeeding the priority symbol.

4. The single-wire bus apparatus of claim 3, wherein the master circuit is further configured to:
modulate the priority symbol and a respective one of the plurality of USID bit symbols to represent a binary one in response to detecting a bit indication CMS in the priority symbol and the respective one of the plurality of USID bit symbols; and
modulate the priority symbol and the respective one of the plurality of USID bit symbols to represent a binary zero in response to not detecting the bit indication CMS in the priority symbol and the respective one of the plurality of USID bit symbols.

5. The single-wire bus apparatus of claim 3, wherein the request is determined to be successful by a respective one of the one or more slave circuits if the plurality of USID bit symbols collectively indicate the multiple bits in the USID that uniquely identify the respective one of the one or more slave circuits.

6. The single-wire bus apparatus of claim 5, wherein each of the plurality of USID bit symbols represents a respective one of the multiple bits in the USID and a first one of the plurality of USID bit symbols immediately succeeding the priority symbol represents a most significant bit (MSB) of the USID.

7. The single-wire bus apparatus of claim 6, wherein, in a first attempt to contend for the single-wire bus, the respective one of the one or more slave circuits is further configured to:
assert a bit indication CMS in a respective one of the plurality of USID bit symbols if a respective one of the multiple bits in the USID that uniquely identifies the respective one of the one or more slave circuits is equal to one; and
not assert the bit indication CMS in the respective one of the plurality of USID bit symbols if the respective one of the multiple bits in the USID that uniquely identifies the respective one of the one or more slave circuits is equal to zero.

8. The single-wire bus apparatus of claim 7, wherein the respective one of the one or more slave circuits is further configured not to assert the bit indication CMS in the priority symbol in the first attempt to contend for the single-wire bus.

9. The single-wire bus apparatus of claim 5, wherein the respective one of the one or more slave circuits is further configured not to assert a bit indication CMS in the priority symbol when the request is determined to be successful.

10. The single-wire bus apparatus of claim 6, wherein, in response to an unsuccessful attempt to contend for the single-wire bus, the respective one of the one or more slave circuits is further configured to:
assert a bit indication CMS in the priority symbol;
assert the bit indication CMS in a respective one of the plurality of USID bit symbols if a respective one of the multiple bits in the USID that uniquely identifies the respective one of the one or more slave circuits is equal to one; and
not assert the bit indication CMS in the respective one of the plurality of USID bit symbols if the respective one of the multiple bits in the USID that uniquely identifies the respective one of the one or more slave circuits is equal to zero.

11. The single-wire bus apparatus of claim 1, wherein each of the plurality of slave circuits is configured to harvest power via the single-wire bus while one of the plurality of slave circuits communicates the data telegram over the single-wire bus.

12. A method for supporting slave-initiated communications to a master circuit over a single-wire bus comprising:
asserting a wakeup current mode signaling (CMS) on the single-wire bus to indicate a request to communicate a data telegram over the single-wire bus in response to a respective data trigger unknown to the master circuit;
receiving a plurality of pulse-width modulation (PWM) symbols via the single-wire bus in response to asserting the wakeup CMS;
determining whether the request is successful based on the plurality of received PWM symbols; and
communicating the data telegram over the single-wire bus in response to determining that the request is successful.

13. The method of claim 12, further comprising:
detecting the wakeup CMS;
transmitting a start-of-sequence (SOS) sequence over the single-wire bus in response to detecting the wakeup CMS; and
transmitting the plurality of PWM symbols via the single-wire bus in an arbitration interval after transmitting the SOS sequence.

14. The method of claim 13, further comprising:
modulating a priority symbol and a respective one of a plurality of USID bit symbols succeeding the priority symbol in the plurality of PWM symbols to represent a binary one in response to detecting a bit indication CMS in the priority symbol and the respective one of the plurality of USID bit symbols; and
modulating the priority symbol and the respective one of the plurality of USID bit symbols to represent a binary zero in response to not detecting the bit indication CMS in the priority symbol and the respective one of the plurality of USID bit symbols.

15. The method of claim 14, further comprising determining the request as being successful if the plurality of USID bit symbols collectively indicates multiple bits in the USID that uniquely identify a respective one of one or more slave circuits.

16. The method of claim 15, further comprising, in a first attempt to contend for the single-wire bus:
asserting a bit indication CMS in a respective one of the plurality of USID bit symbols if a respective one of the multiple bits in the USID is equal to one; and
not asserting the bit indication CMS in the respective one of the plurality of USID bit symbols if the respective one of the multiple bits in the USID is equal to zero.

17. The method of claim 16, further comprising not asserting the bit indication CMS in the priority symbol in the first attempt to contend for the single-wire bus.

18. The method of claim 15, further comprising not asserting a bit indication CMS in the priority symbol when the request is determined to be successful.

19. The method of claim 15, further comprising, in response to an unsuccessful attempt to contend for the single-wire bus:
asserting a bit indication CMS in the priority symbol;
asserting the bit indication CMS in a respective one of the plurality of USID bit symbols if a respective one of the multiple bits in the USID is equal to one; and
not asserting the bit indication CMS in the respective one of the plurality of USID bit symbols if the respective one of the multiple bits in the USID is equal to zero.

20. The method of claim 12, further comprising harvesting power via the single-wire bus while one of a plurality of slave circuits communicates the data telegram over the single-wire bus.

21. A wireless device comprising a single-wire bus apparatus, the single-wire bus apparatus comprises:
- a master circuit coupled to a single-wire bus consisting of one wire; and
- a plurality of slave circuits each coupled to the single-wire bus and uniquely identified by a unique slave identification (USID) comprising multiple bits;
- wherein one or more slave circuits among the plurality of slave circuits are each configured to:
    - assert a wakeup current mode signaling (CMS) on the single-wire bus to indicate a request to communicate a data telegram over the single-wire bus in response to a respective data trigger unknown to the master circuit;
    - receive a plurality of pulse-width modulation (PWM) symbols via the single-wire bus in response to asserting the wakeup CMS;
    - determine whether the request is successful based on the plurality of received PWM symbols; and
    - communicate the data telegram over the single-wire bus in response to determining that the request is successful.

* * * * *